US010740214B2

(12) United States Patent
Tezuka et al.

(10) Patent No.: US 10,740,214 B2
(45) Date of Patent: Aug. 11, 2020

(54) MANAGEMENT COMPUTER, DATA PROCESSING SYSTEM, AND DATA PROCESSING PROGRAM

(71) Applicant: HITACHI, LTD., Tokyo (JP)

(72) Inventors: Shin Tezuka, Tokyo (JP); Kentarou Watanabe, Tokyo (JP); Nobuhiro Maki, Tokyo (JP); Yuichi Taguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/335,103

(22) PCT Filed: Nov. 29, 2016

(86) PCT No.: PCT/JP2016/085358
§ 371 (c)(1),
(2) Date: Mar. 20, 2019

(87) PCT Pub. No.: WO2018/100622
PCT Pub. Date: Jun. 7, 2018

(65) Prior Publication Data
US 2019/0235986 A1     Aug. 1, 2019

(51) Int. Cl.
*G06F 11/34* (2006.01)
*G06F 11/30* (2006.01)
*G06F 13/00* (2006.01)

(52) U.S. Cl.
CPC ...... *G06F 11/3495* (2013.01); *G06F 11/3024* (2013.01); *G06F 13/00* (2013.01)

(58) Field of Classification Search
None
See application file for complete search history.

(56) References Cited

U.S. PATENT DOCUMENTS

2012/0137343 A1    5/2012  Uchida
2016/0036918 A1*   2/2016  Lee .................... H04L 67/322
                                                    370/230

(Continued)

FOREIGN PATENT DOCUMENTS

JP    2014-241024 A    12/2014
JP    2016-163242 A    9/2016

(Continued)

*Primary Examiner* — Charles E Anya
(74) *Attorney, Agent, or Firm* — Volpe and Koenig, P.C.

(57) ABSTRACT

Described is a means for switching a plurality of different data processing methods or means for changing the type of sensor data to be collected is required. A management computer includes a control unit which stores, in a memory, monitoring means for monitoring a plurality of operation processes to be monitored and management means connected to a network to manage management information about a plurality of different types of external devices for processing a plurality of types of sensor information via the network, the control unit executing the monitoring means and management means in a CPU, in which the control unit determines whether the plurality of operation processes to be monitored is changed, and instructs, when determining that the operation processes are changed, the plurality of different types of external devices to change the processing of the sensor information required to execute the operation processes before changing.

12 Claims, 20 Drawing Sheets

(56) References Cited

U.S. PATENT DOCUMENTS

| | | | |
|---|---|---|---|
| 2016/0261481 A1 | 9/2016 | Ogata et al. | |
| 2017/0126569 A1* | 5/2017 | Seed | H04W 4/70 |
| 2017/0126704 A1* | 5/2017 | Nandha Premnath | H04L 63/145 |
| 2017/0177395 A1* | 6/2017 | Sun | G06F 9/45558 |
| 2018/0247515 A1* | 8/2018 | Brady | G08B 25/10 |
| 2019/0306024 A1* | 10/2019 | Petria | H04L 12/66 |

FOREIGN PATENT DOCUMENTS

| | | |
|---|---|---|
| WO | 2011/018937 A1 | 2/2011 |
| WO | 2013/121572 A1 | 8/2013 |

* cited by examiner

FIG. 4

| T2200 | T2201 | T2202 | T2203 | T2204 | T2205 | T2206 | |
|---|---|---|---|---|---|---|---|
| PROCESSING DEFINITION ID | SENSOR DATA | PROCESSING | PARAMETER | PROCESSED DATA DESTINATION | REFERENCE COUNT | ... |
| 1 | SENSOR DATA 1, 2 | CLASSIFICATION: REAL-TIME PROCESSING PROCESSING: ANALYZE SENSOR DATA AND OUTPUT FAILURE EVENT | Windows SIZE: 5 SECONDS | DATA PROVIDING COMPUTER 1 | 2 | ... |
| 2 | SENSOR DATA 6 | CLASSIFICATION: BATCH PROCESSING PROCESSING: STATISTICALLY ANALYZE SENSOR DATA AND OUTPUT RESULT | PERFORMANCE TIMING: 3 O'CLOCK EVERY DAY | DATA PROVIDING COMPUTER 3 | 1 | ... |
| ... | ... | ... | ... | ... | ... | ... |

FIG. 5

| Hub PROCESSING DEFINITION ID | SENSOR DATA ID | SOURCE GATEWAY COMPUTER | DESTINATION DATA PROCESSING COMPUTER | REFERENCE COUNT | ... |
|---|---|---|---|---|---|
| 1 | 1 | GATEWAY COMPUTER 1 | DATA PROCESSING COMPUTERS 1, 2, 3 | 3 | ... |
| 2 | 2 | GATEWAY COMPUTER 1 | DATA PROCESSING COMPUTERS 1, 2, 3, 4 | 4 | ... |
| 3 | 3 | GATEWAY COMPUTER 1 | DATA PROCESSING COMPUTERS 2 | 1 | ... |
| ... | ... | ... | ... | ... | ... |

| GATEWAY PROCESSING DEFINITION ID | SENSOR DATA | COLLECTION INTERVAL | DESTINATION Hub COMPUTER | REFERENCE COUNT | ... |
|---|---|---|---|---|---|
| 1 | SENSOR DATA 1 | 1 SECOND | Hub COMPUTER 1 | 3 | ... |
| 2 | SENSOR DATA 2 | 1 SECOND | Hub COMPUTER 1 | 4 | ... |
| 3 | SENSOR DATA 3 | 60 SECONDS | Hub COMPUTER 1 | 1 | ... |
| 4 | SENSOR DATA 4 | - | Hub COMPUTER 1 | 1 | ... |
| 5 | SENSOR DATA 5 | 10 SECONDS | Hub COMPUTER 1 | 1 | ... |
| ... | ... | ... | ... | ... | ... |

| T1400 | T1401 | T1402 | T1403 | T1404 | T1405 | |
|---|---|---|---|---|---|---|
| | CONDITION ID | PROCESSING METHOD CHANGE CONDITION | PROCESSING METHOD ID | DETECTION COMPLETION FLAG | PRIORITY LEVEL | ... |
| | 1 | OPERATION PROCESS HAS CHANGED (FAILURE DETECTION OPERATION IS IN PROGRESS) | 1, 2 | T | MEDIUM | ... |
| | 2 | OPERATION PROCESS HAS CHANGED (FAILURE CAUSE IDENTIFICATION OPERATION IS IN PROGRESS) | 3 | F | HIGH | ... |
| | 3 | OPERATION PROCESS HAS CHANGED (FAILURE CAUSE IDENTIFICATION OPERATION IS IN PROGRESS) | 4 | F | MEDIUM | ... |
| | 4 | VALUE OF DATA IS INCREASED (EARTHQUAKE IS DETECTED) | 5 | T | HIGH | ... |
| | 5 | VALUE OF DATA IS DECREASED | 6 | F | LOW | ... |
| | ... | ... | ... | ... | ... | ... |

FIG. 8

| PROCESSING METHOD DEFINITION ID (T1420) | SENSOR DATA (T1421) | DATA PROCESSING DEFINITION (T1422) | PARAMETER (T1423) | DATA PROCESSING COMPUTER (T1424) | PROCESSED DATA DESTINATION (T1425) | ... (T1426) |
|---|---|---|---|---|---|---|
| 1 | SENSOR DATA 1<br>SENSOR DATA 2 | CLASSIFICATION: REAL-TIME PROCESSING<br>PROCESSING: ANALYZE SENSOR DATA AND OUTPUT FAILURE EVENT | Windows SIZE: 10 SECONDS | DATA PROCESSING COMPUTER 1 | DATA PROVIDING COMPUTER 1 | ... |
| 2 | SENSOR DATA 1<br>SENSOR DATA 2<br>SENSOR DATA 3 | CLASSIFICATION: BATCH PROCESSING<br>PROCESSING: STATISTICALLY ANALYZE SENSOR DATA AND OUTPUT RESULT | PERFORMANCE TIMING: 3 O'CLOCK EVERY DAY | DATA PROCESSING COMPUTER 2,<br>DATA PROCESSING COMPUTER 3 | DATA PROVIDING COMPUTER 1 | ... |
| 3 | SENSOR DATA 1<br>SENSOR DATA 2<br>SENSOR DATA 4 | CLASSIFICATION: REAL-TIME PROCESSING<br>PROCESSING: ANALYZE SENSOR DATA AND OUTPUT FAILURE CAUSE | Windows SIZE: 60 SECONDS | DATA PROCESSING COMPUTER 2 | DATA PROVIDING COMPUTER 1 | ... |
| 4 | SENSOR DATA 2<br>SENSOR DATA 5 | CLASSIFICATION: BATCH PROCESSING<br>PROCESSING: ANALYZE SENSOR DATA AND OUTPUT OPTIMUM TIMING TO IMPLEMENT COUNTERMEASURES | TIMING: AS NEEDED | DATA PROCESSING COMPUTER 4 | DATA PROVIDING COMPUTER 2 | ... |
| 5 | SENSOR DATA 6 | CLASSIFICATION: REAL-TIME PROCESSING<br>PROCESSING: ANALYZE SENSOR DATA AND OUTPUT FAILURE EVENT | Windows SIZE: 60 SECONDS | DATA PROCESSING COMPUTER 1 | DATA PROVIDING COMPUTER 3 | ... |
| 6 | SENSOR DATA 6 | CLASSIFICATION: BATCH PROCESSING<br>PROCESSING: ANALYZE SENSOR DATA AND OUTPUT FAILURE EVENT | PERFORMANCE TIMING: 3 O'CLOCK EVERY DAY | DATA PROCESSING COMPUTER 1 | DATA PROVIDING COMPUTER 4 | ... |
| ... | ... | ... | ... | ... | ... | ... |

FIG. 9

| T1430 | T1431 | T1432 | T1433 | T1434 | T1435 |
|---|---|---|---|---|---|
| DATA PROCESSING COMPUTER ID | IP | EXECUTABLE PROCESSING | ALLOCATED RESOURCE | LOAD CONDITION | ... |
| 1 | 192.168.X.X | CLASSIFICATION: REAL-TIME PROCESSING PROCESSING: ANALYZE SENSOR DATA AND OUTPUT FAILURE EVENT | CPU:6 MEMORY: 32 GB | HIGH | ... |
| 2 | 192.168.X.X | CLASSIFICATION: REAL-TIME PROCESSING PROCESSING: STATISTICALLY ANALYZE SENSOR DATA AND OUTPUT RESULT<br><br>CLASSIFICATION: REAL-TIME PROCESSING PROCESSING: ANALYZE SENSOR DATA AND OUTPUT FAILURE CAUSE | CPU:4 MEMORY: 16 GB | MEDIUM | ... |
| 3 | 192.168.X.X | CLASSIFICATION: BATCH PROCESSING PROCESSING: STATISTICALLY ANALYZE SENSOR DATA AND OUTPUT RESULT | CPU:4 MEMORY: 16 GB | LOW | ... |
| ... | ... | ... | ... | ... | ... |

FIG. 10

| Hub COMPUTER ID | IP | DESTINATION DATA PROCESSING COMPUTER | ALLOCATED RESOURCE | LOAD CONDITION | ... |
|---|---|---|---|---|---|
| 1 | 192.168.X.X | DATA PROCESSING COMPUTERS 1, 2, 3 | CPU: 6<br>MEMORY: 16 GB<br>STANDBY<br>DB CAPACITY:<br>3 TB | HIGH | ... |
| 2 | 192.168.X.X | DATA PROCESSING COMPUTERS 4 | CPU: 4<br>MEMORY: 8 GB<br>STANDBY<br>DB CAPACITY:<br>1 TB | LOW | ... |
| ... | ... | ... | ... | ... | ... |

| GATEWAY COMPUTER ID | IP | MANAGEMENT SENSOR | ... |
|---|---|---|---|
| 1 | 192.168.X.X | SENSORS 1, 2, 3, 4, 5 | ... |
| 2 | 192.168.X.X | SENSORS 6 | ... |
| ... | ... | ... | ... |

| SENSOR ID (T1460) | TYPE (T1461) | INSTALLATION LOCATION (T1462) | COLLECTION METHOD (T1463) | COLLECTABLE INTERVAL (T1464) | IP (T1465) | ... (T1466) |
|---|---|---|---|---|---|---|
| 1 | TEMPERATURE | LINE A MOTOR | PULL | 1 SECOND | 192.168.X.X | ... |
| 2 | VIBRATION | LINE A MOTOR | PULL | 1 SECOND | 192.168.X.X | ... |
| 3 | PRESSURE | LINE A PUMP | PULL | 1 SECOND | 192.168.X.X | ... |
| 4 | AMBIENT TEMPERATURE | BUILDING A, ROOM B | PUSH | 10 SECONDS | 192.168.X.X | ... |
| 5 | NUMBER OF COMPONENTS PASSED | LINE B | PULL | 60 SECONDS | 192.168.X.X | ... |
| ... | ... | ... | ... | ... | ... | ... |

MANAGEMENT COMPUTER, DATA PROCESSING SYSTEM, AND DATA PROCESSING PROGRAM

TECHNICAL FIELD

The present invention relates to an IoT data processing device which controls a data processing path, processing method, and the like for sensor data and the like.

BACKGROUND ART

Internet of Things (IoT) which connects various devices to the Internet attracts attention and operation which utilizes data collected from IoT devices have grown.

The IoT devices connected to the Internet can provide various sensor data, such as temperature, pressure, and vibration, and these sensor data are collected via a device called gateway. The collected sensor data are subjected to processing, such as cleansing for shaping data or removing unnecessary data, aggregation by statistical methods, and analysis. The processed data as a result of the processing is utilized for a cloud operation application.

As Background Art of the present invention, for example, WO 2013/121572 (PTL 1) is disclosed. PTL 1 discloses a technology that "when data distributed in one system is acquired and stored in a database and an application in a system itself or an access from another system is provided to the database, a large amount of data generated or high load in conversion processing, or the like causes retention of data, and thereby a failure may occur, for example, performance requirements from an app are not satisfied or data is lost. (1) Hierarchical processing modules can be plugged in to the hierarchies of "reception", "analysis", "conversion", and "transmission". (2) Priority level is determined to distribute data, on the basis of the type, importance, frequency, or the like of the data and processing timing of an application using the corresponding data. (3) Data which cannot be converted due to inconsistency with conversion definitions are accumulated and managed separately. For the application, a list of the corresponding data is presented."

CITATION LIST

Patent Literature

PTL 1: WO 2013/121572

SUMMARY OF INVENTION

Technical Problem

It is conceivable that an operation process utilizing data from IoT devices changes frequently. Consider, for example, a case where operation of detecting the occurrence of a failure is steadily performed by collecting and analyzing sensor data from sensors attached to machines in a factory or the like. When a failure occurs, this operation changes to an operation of investigating the cause of the failure or an operation of implementing countermeasures, in the operation process. Applications (app) in the respective operations require different processed data, the types of the sensor data as a source of the processed data, and processing methods for the collected sensor data.

In addition, when an earthquake occurs, the values of various data may change. For example, to more accurately detect a failure of a device installed in a factory in an area where the earthquake occurred, the importance of sensor data of a sensor installed in the factory may increase or decrease, compared with that before occurrence of the earthquake.

Therefore, in an environment where an operation process changes or the value of data changes according to a change in the operation process, means for switching a plurality of different data processing methods or means for changing the type of sensor data to be collected is required.

In PTL 1, sensor data can be delivered to an app with timing at which the app requires the sensor data. However, no means is disclosed for switching a plurality of different sensor data, processing methods for the sensor data, and the like, according to a change in an operation process or the value of data changing according to the change in an operation process.

Accordingly, an object of the present invention is to provide means for switching a plurality of different sensor data and processing methods for the sensor data according to a change in operation process or value of data to deliver the processed data to an app.

Solution to Problem

In order to solve the above problems, for example, one aspect of the present invention includes a control unit which stores, in a memory, monitoring means which monitors a plurality of operation processes to be monitored and management means which is connected to a network to manage management information about a plurality of different types of external devices for processing a plurality of types of sensor data via the network, the control unit executing the monitoring means and management means in a CPU, in which the control unit determines whether the plurality of operation processes to be monitored is changed, and instructs, when determining that the operation processes are changed, the plurality of different types of external devices to change the processing of the sensor information required to execute the operation processes after changing.

Advantageous Effects of Invention

According to the present invention, instructing a plurality of types of computers to change processing of sensor data required for a change in operation process or a change in value of data due to a change in the operation process enables distribution of the sensor data to a corresponding app.

Problems, configurations, and effects other than those in the above description will be made clear in the following description of the embodiments.

BRIEF DESCRIPTION OF DRAWINGS

FIG. 4 is a diagram illustrating a configuration example of a data processing definition table.

FIG. 5 is a diagram illustrating a configuration example of a Hub processing definition table.

FIG. 6 is a diagram illustrating a configuration example of a gateway processing definition table.

FIG. 7 is a diagram illustrating a configuration example of a processing method change condition table.

FIG. 8 is a diagram illustrating a configuration example of a processing method definition table.

FIG. 9 is a diagram illustrating a configuration example of a data processing computer management table.

FIG. 10 is a diagram illustrating a configuration example of a Hub computer management table.

FIG. 11 is a diagram illustrating a configuration example of a gateway computer management table.

FIG. 12 is a diagram illustrating a configuration example of a sensor management table.

DESCRIPTION OF EMBODIMENTS

Hereinafter, embodiments of the present invention will be described with reference to the drawings.

It is to be noted that the examples and drawings, which will be described below, are one of the embodiments of the present invention and do not limit the application thereof to other configurations and embodiments which can perform the same processing.

First Example

In a first example, a description will be given of an embodiment of the present application by taking a machine failure detection operation, cause analysis operation, and countermeasure implementation operation in a factory or the like producing a certain product, for example.

It is assumed that the failure detection operation, of the above operations, is regularly performed by using a sensor attached to a machine to measure the temperature, vibration, or the like of the machine. Furthermore, it is assumed that on the basis of detecting a failure of the machine, an operation process changes to the cause analysis operation and countermeasure implementation operation.

In addition, for example, when an earthquake occurs, a machine in a factory located in an area affected by the earthquake is likely to fail, and thus, it is important to detect the failure quickly, and the value of sensor data from a sensor attached to the machine increases.

In the first example, a processing method for sensor data is changed depending on such a change in the operation process or the value of the sensor data changing in response to the change of the operation process, and data required by an app is distributed to the app performing an operation. Therefore, for example, it is possible to detect a predictive failure of a device affected by the occurrence of an earthquake, and it is possible to analyze the cause of the failure and to implement countermeasures for the failure after detecting the failure.

A. Overview

Figure 1:
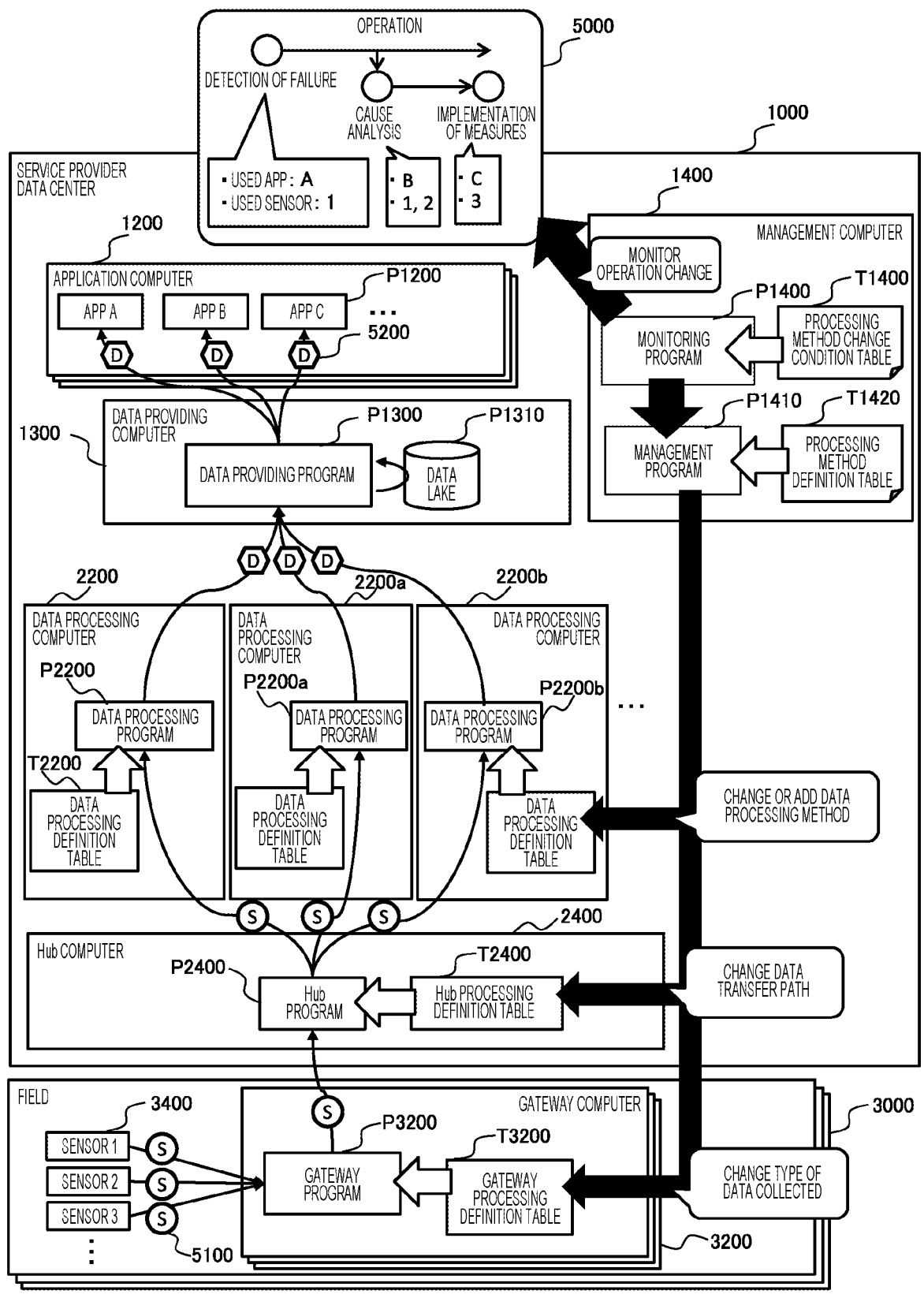
FIG. 1 is a diagram illustrating an overview of the present invention.

A system according to the present example will be described with reference to FIG. 1 which is a conceptual diagram. FIG. 1 is a schematic diagram illustrating processing of sensor data 5100 from a sensor 3400 installed in a machine by using a computer of a service provider data center 1000 to perform operation 5000 including the machine failure detection, cause analysis, and countermeasure implementation and distributing the sensor data 5100 to an app performing an operation, and switching the processing method for the sensor data in response to a change in operation process.

A field 3000 represents, for example, one or more factories producing a certain product and includes one or more sensors 3400 and one or more gateway computers 3200. Each of the sensors 3400 is a generation source of the sensor data 5100, and includes, for example, a thermometer attached to a building or a room of a factory, a vibrometer attached to a machine or the like for manufacturing the product, or the like.

Each of the gateway computers 3200 is, for example, a computer for providing transmission means for transmitting the sensor data 5100 from the sensor 3400 having no function of connecting to the Internet to the service provider data center 1000 or the like for processing the sensor data 5100. A gateway program P3200 included in the gateway computer 3200 provides the transmission means, uses a gateway processing definition table T3200 including the sensor data 5100 to be collected and the information about a Hub computer being a destination to collect the sensor data 5100 from the sensor 3400, and transmits the sensor data 5100 to the Hub computer 2400.

The service provider data center 1000 is, for example, a data center of a service provider providing a cloud computing service.

The Hub computer 2400 is a computer for providing means for mediating (relaying) transmission and reception of the sensor data between a gateway computer and a data processing computer. Owing to the Hub computer 2400, for example, the gateway computer and the data processing computer do not need to consider specification change, such as a change in Internet Protocol (IP) address between the gateway computer and the data processing computer. The Hub computer 2400 has a Hub program P2400 which refers to a Hub processing definition table T2400 including the sensor data 5100 to be received, information about the data processing computers, and the like to transmit the sensor data 5100 to one or a plurality of data processing computers 2200.

The data processing computer 2200 is a computer for performing processing such as format conversion processing for converting the received sensor data 5100 into a format required by an app P1200 which is described later, or analysis processing of the received sensor data 5100. The data processing computer 2200 has a data processing program P2200 which processes one or a plurality of sensor data 5100 received from the Hub computer 2400 on the basis of processing definition information stored in a data processing definition table T2200, and transmits processed data 5200 subjected to the processing described above to a data providing computer 1300.

In addition to the format conversion processing, the processing described above may include cleansing processing for removing unnecessary data, counting processing, device failure detection processing, cause analysis processing for a device failure, and the like or other processing. In addition, the processing described above may be performed with timing, for example, in real time by using a stream method or periodically by using batch processing. Furthermore, data processing computers 2200a and 2200b are preferably equivalent to the data processing computer 2200, and the description thereof is omitted.

The data providing computer 1300 temporarily stores the processed data 5200 received from the data processing computer 2200 in a data lake P1310 and includes means for providing an application programming interface (API) and the like so that the one or a plurality of apps P1200 of an application computer may acquire the processed data 5200. The application computer 1200 includes the applications P1200 performing the operations described above.

A management computer 1400 is a computer for controlling the processing method for the sensor data to deliver data to an app performing an operation in response to a change in the operation process. A monitoring program P1400 is a program for monitoring a change in the operation process or value of data on the basis of processing method change condition information stored in a processing method change condition table T1400, and instructs a management program P1410 to control, for example, change the processing method for the sensor data upon generation of the change. Note that the processing method change condition information is, for example, information or the like indicating a change in value of data, such as an operation state, a processing result, or the like of an app P1200 indicating a change in the operation process, an alarm of occurrence of an earthquake, and detailed description will be given later.

The management program P1410 is a program for controlling, for example, changing the processing methods of the gateway computers 3200, the Hub computer 2400, and the data processing computers 2200. The control of the processing method is performed by changing information stored in the processing definition tables (T3200, T2400, T2200) of the gateway computers 3200, the Hub computer 2400, and the data processing computers 2200, on the basis of processing method definition information stored in a processing method definition table T1420 in response to a change in the operation process or the value of data detected by the monitoring program P1400.

Here, an example will be described in which when, upon detection of a failure of a machine, the operation 5000 changes the operation process to the cause analysis and further to the countermeasure implementation for a device failure, the monitoring program P1400 and the management program P1410 change the processing method of the sensor data 5100.

Firstly, it is assumed that the machine failure detection operation is an operation carried out regularly and periodically, and the sensor data 5100 from a sensor 1 is used. Thus, the sensor data 5100 is delivered to the app A via a gateway computer 3200, the Hub computer 2400, the data processing computer 2200, and the data providing computer 1300.

It is assumed that for the cause analysis operation for a machine failure uses the sensor data 5100 from the sensor 1 and a sensor 2. Thus, it is assumed that the sensor data 5100 is distributed to an app B via a gateway computer 3200, the Hub computer 2400, the data processing computer 2200a, and the data providing computer 1300. Note that when a machine failure is detected by the app A, it is assumed that the app A activates the app B for cause analysis of the machine failure.

It is assumed that the countermeasure implementation operation uses the sensor data 5100 from a sensor 3. Thus, it is assumed that the sensor data 5100 is distributed to an app C via a gateway computer 3200, the Hub computer 2400, the data processing computer 2200b, and the data providing computer 1300. When the cause of the machine failure is identified by the app B, the app B activates the app C.

When the monitoring program P1400 detects the start of operation of the app B, the monitoring program P1400 determines that the cause analysis operation for the machine failure is started and give notification to the management program P1410.

The management program P1410 refers to the processing method definition table T1420 and changes a processing method in the system so that the sensor data 5100 from the sensor 2 necessary for the failure cause analysis operation is delivered to the app B.

Specifically, firstly, the gateway processing definition table T3200 is changed to collect the sensor data from the sensor 2 in addition to the sensor 1, and the Hub processing definition table is changed so that the sensor data is processed by the data processing program P2200a of the data processing computer 2200a. Furthermore, the data processing definition table T2200 is changed so that the sensor data is processed to satisfy use requirements for the app B.

When the operation changes from the cause analysis operation for a device failure to the countermeasure implementation operation, the monitoring program P1400 detects the operation of the app C, and the management program P1410 rewrites the gateway processing definition table T3200, the Hub processing definition table T2400, and the data processing definition table T2200 so that the sensor data 5100 from the sensor 3 is delivered to the app C via the data processing computer 2200b.

As described above, in the present example, performance of a series of processing described above enables collection of sensor data and processing of the sensor data in response to a change in operation process or value of data, and processed data can be distributed to each app. Therefore, for example, it is possible to detect a predictive failure of a device affected by the occurrence of an earthquake, and it is possible to analyze the cause of the failure and to implement countermeasures for the failure after detecting the failure. Details of the present example will be described below.

B. Configuration of Each Device

Figure 2:
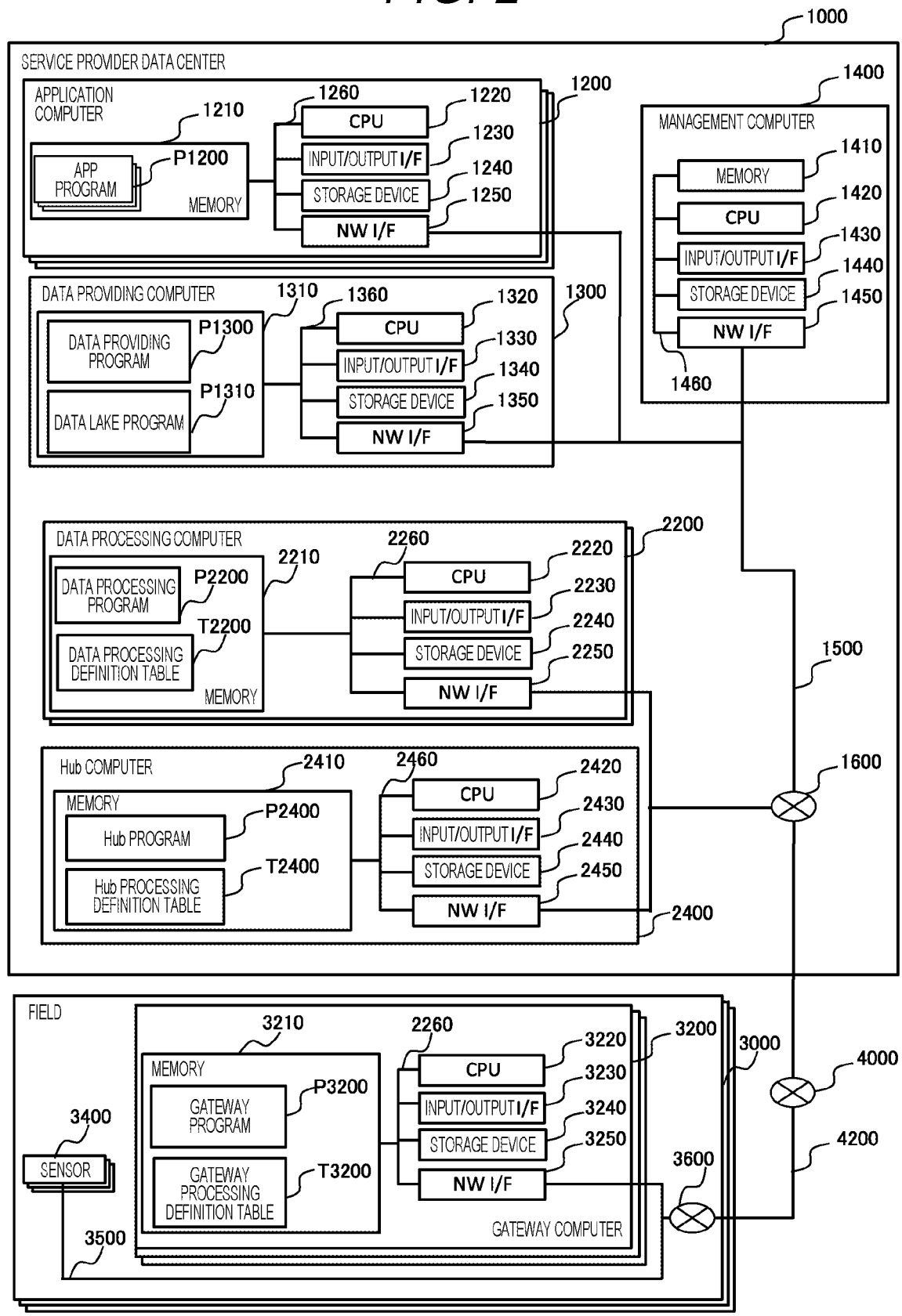
FIG. 2 is a block diagram illustrating a configuration example of the whole of a system.

Each device constituting the system according to the present example will be described below with reference to FIGS. 2 to 3. FIG. 2 is a block diagram illustrating a configuration example of the whole of the system.

The system being the subject of the present application includes the fields 3000 illustrated in FIG. 1, various computers installed in the service provider data center 1000, a network 4200, and a network device 4000.

Each of the field 3000 has a sensor 3400 and the gateway computers 3200. Each of the gateway computers 3200 includes a memory 3210, a CPU 3220, an input/output interface (I/F) 3230, a storage device 3240, and a network interface (NW I/F) 3250 which are connected to each other by an internal bus 2260. The memory 3210 includes the gateway program P3200 and the gateway processing definition table T3200 which are executed by the CPU 3220.

The sensor 3400 and the gateway computer 3200 are connected by a network 3500 and a network device 3600. Furthermore, the network device 3600 is connected to the network 4200 and the network device 4000.

The service provider data center 1000 includes the Hub computer 2400, the data processing computers 2200, the data providing computer 1300, the application computers 1200, and the management computer 1400 which are connected to each other via a network 1500 and a network device 1600. Furthermore, the network device 1600 is connected to the network 4200 and the network device 4000.

The Hub computer 2400 includes a memory 2410, a CPU 2420, an input/output I/F 2430, a storage device 2440, and an NW I/F 2450 which are connected by an internal bus 2460. The Hub computer 2400 receives sensor data transmitted from a gateway computer 3200 via the NW I/F 2450, accumulates the sensor data in the storage device 2440, and transmits the sensor data to one or more data processing computers 2200. The memory 2410 includes the Hub program P2400 and the Hub processing definition table T2400 which are executed by the CPU 2420.

Each of the data processing computer 2200 includes a memory 2210, a CPU 2220, an input/output I/F 2230, a storage device 2240, and an NW I/F 2250 which are connected by an internal bus 2260. The memory 2210 of the data processing computer 2200 includes the data processing program P2200 and the data processing definition table T2200 which are executed by the CPU 2220. Note that the data processing program P2200 may include different types of programs, such as a data processing program for executing device failure detection processing and a device failure cause analysis processing program, and the different types of programs may be included in one data processing computer 2200 or in a plurality of different data processing computers 2200.

The data providing computer 1300 includes a memory 1310, a CPU 1320, an input/output I/F 1330, a storage device 1340, and an NW I/F 1350 which are connected by an internal bus 1360. The memory 1310 includes a data providing program P1300 and a data lake program P1310 which are executed by the CPU 1320. Note the processed data 5200 transmitted by the data providing program P1300 is received by the data lake program P1310 and stored in the memory 1310 or the storage device 1340.

The application computer 1200 includes a memory 1210, a CPU 1220, an input/output I/F 1230, a storage device 1240, and an NW I/F 1250 which are connected by an internal bus 1360. The application computer 1200 receives data transmitted from a data processing computer 2200 via the NW I/F 1250. The memory 1210 of the application computer includes one or a plurality of app programs P1200 loaded from the storage device 1240.

Note that one or a plurality of apps P1200 may be employed, and in addition to the processed data 5200, an output from another app may be input or information collected from a system other than the system described in the present application may be input. Furthermore, the data providing computer 1300 may immediately transmit the processed data 5200 received from the data processing computer 2200 to the app program P1200 without storing the processed data 5200 in the data lake P1310. Still furthermore, when the service provider provides software as a service (SaaS), the user of the app P1200 may be different from the service provider.

The management computer 1400 includes a memory 1410, a CPU 1420, an input/output I/F 1430, a storage device 1440, and an NW I/F 1450 which are connected by an internal bus 1260. Note that the detailed configuration of the management computer 1400 will be described later with reference to FIG. 3.

The network device 4000 includes one or more network devices which connect a field 3000, a computer in the service provider data center 1000, a sensor 3400, and other devices. The network 4200 is, for example, the Internet but may be a virtual private network (VPN) or another network.

All of the computers described above may be physical computers or virtual computers operating on a physical computer. Furthermore, each of the storage devices of the computers is not an essential element and may be, for example, an external storage device. The NW I/F provided in each of the computers is, for example, but not limited to, a network interface card (NIC) and may be another I/F.

Furthermore, each computer may include an input/output I/F, for example, an output device, such as a display, and a keyboard or mouse, or when the computer is remotely managed via a network by using means such as Secure Shell (SSH), an input I/F is not an essential element. Each of the programs and tables included in the above computers may be included in each of the storage devices of the computers. A physical device other than those described in the present application, wiring for connecting the devices, or the like may be employed.

Figure 3:
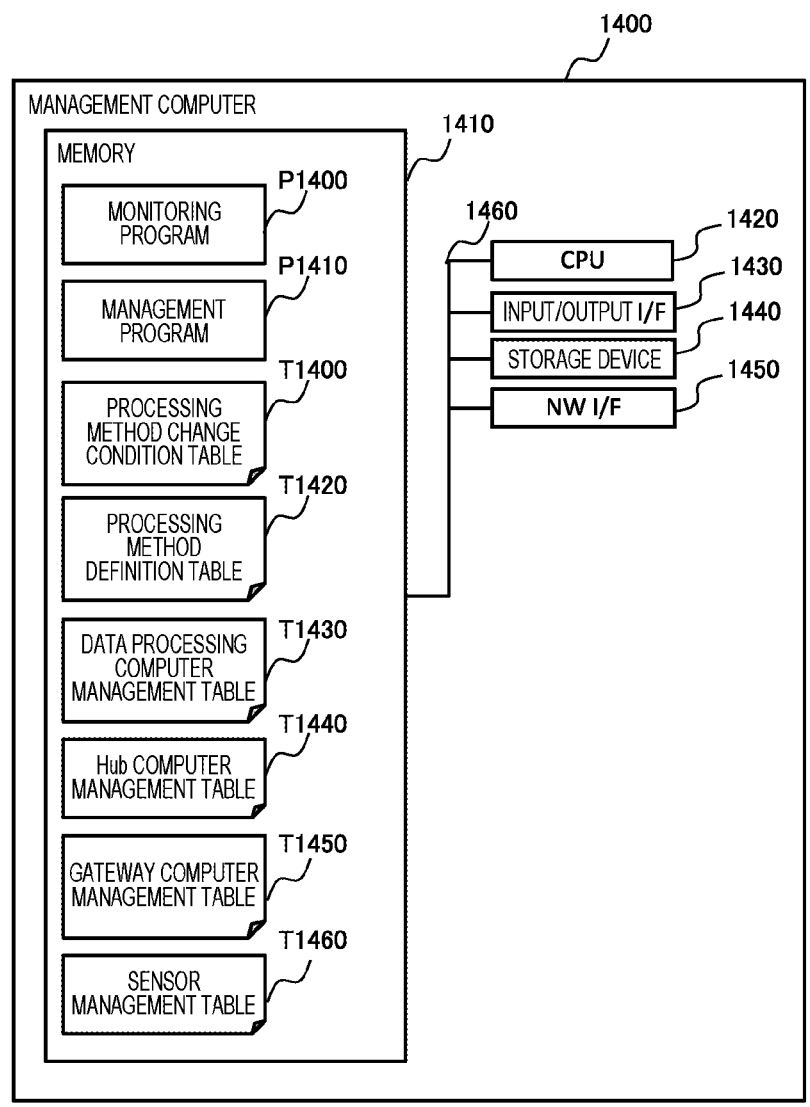
FIG. 3 is a block diagram illustrating a configuration example of a management computer.

FIG. 3 is a block diagram illustrating a detailed configuration of the management computer 1400. Note that a description will be omitted of the configurations of the CPU 1420 and the like of the management computer 1400 which are described above.

The memory 1410 of the management computer 1400 includes the monitoring program P1400 for monitoring a change in the operation process or the value of data, the management program P1410 for controlling the processing method for the sensor data or the processed data, the processing method change condition table T1400 including information used for monitoring by the monitoring program P1400, the processing method definition table T1420 including information used for controlling the processing method by the management program, a data processing computer management table T1430 including information about a data processing computer, such as acceptable processing or an IP address, a Hub computer management table T1440 including information about a data processing computer capable of transferring sensor data or information about the Hub computer, such as an IP address, a gateway computer management table T1450 including information about a gateway computer, such as collectable sensor data or an IP address, and a sensor management table T1460 including sensor information, such as the type of a sensor. Each of the programs is read from the storage device 1440 into the memory 1410 and executed by the CPU 1420.

Details of each table will be described later with reference to FIGS. 4 to 12. Furthermore, the operation of each program will be described with reference to FIGS. 13 to 16.

C. Tables

Details of each of the tables illustrated in FIGS. 4 to 12 will be described. In the present example, each table is described as, for example, "abc table", but the present example is not limited to the table and may be in the form of a list. Furthermore, an element of the "abc table" can be called a "record". The "abc table" can be further called as "abc information".

FIG. 4 is a diagram illustrating a configuration example of the data processing definition table T2200. The data processing definition table T2200 is a table which is referred to by the data processing program P2200 and defines how to process sensor data transmitted from the Hub computer. The data processing definition table T2200 includes a processing definition ID T2201, sensor data T2202, and processing T2203, and is updated by the management program P1410.

The processing definition ID T2200 represents a unique ID in the table given to each record. The sensor data T2202 represents an ID of sensor data to be input to the data processing program P2200. Note that a plurality of sensor data may be specified. The processing T2203 represents how to process the input sensor data. For example, a process of analyzing sensor data in real time and outputting a failure event, a process of statistically analyzing sensor data on a daily basis and outputting a range of values of normal sensor data as a result (also referred to as a batch process), or the like is described in the processing T2203.

A parameter T2204 is a parameter for executing the processing T2203. For example, when processing is classified into the real-time processing, Window size is indicated, and when the processing is classified into the batch processing, date and time or the like of execution timing is indicated. A processed data destination T2205 represents that the processed data 5200 subjected to the processing described above is to be transmitted to which data providing computer. A reference count T2206 represents the number of corresponding records in the processing method definition table, which is described later, and the reference count T2206 is incremented or decremented by the management program P1410. Note that the data processing program processes the sensor data according to a content having a record whose reference count T2206 is 1 or more.

FIG. 5 is a diagram illustrating a configuration example of the Hub processing definition table T2400. The Hub processing definition table T2400 is a table which is referred to by the Hub program P2400 and defines that sensor data 5100 transmitted from a gateway program P3200 is to be transmitted to which data processing computer 2200. The Hub processing definition table T2400 includes a Hub processing definition ID T2401, sensor data ID T2402, source gateway computer T2403, and reference count T2405, and is updated by the management program P1410.

The Hub processing definition ID T2401 represents a unique ID in the table given for each record. The sensor data ID T2402 represents an ID for identifying sensor data 5100 received from a gateway program P3200. The source gateway computer as a T2403 represents a gateway computer as a source of the sensor data. The destination data processing computer T2404 represents that the received sensor data is to be transmitted to which data processing computer 2200. The reference count T2405 represents the number of corresponding records in the processing method definition table T1420, which is described later, and is incremented or decremented by the management program P1410. Note that the Hub program P2400 executes reception and transmission of the sensor data according to a content having a record whose reference count T2405 is 1 or more.

FIG. 6 is a diagram illustrating a configuration example of the gateway processing definition table T3200. The gateway processing definition table T3200 is a table which is referred to by a gateway program P3200 and defines that sensor data 5100 are to be collected from which sensor and the collected sensor data are to be transmitted to which Hub computer 2400.

The gateway processing definition table T3200 includes a gateway processing definition ID T3201, sensor data T3202, collection interval T3203, destination Hub computer T3204, and reference count T3205, and is updated by the management program P1410.

The gateway processing definition ID T3201 represents a unique ID in the table given to each record. The sensor data T3202 is an entry for identifying a sensor 3400 generating sensor data 5100 to be collected by the gateway program P3200. The collection interval T3203 represents an interval between which the sensor data is collected from the sensor. Note that a sensor 3400 actively transmitting data to the gateway program P3200 has no value indicating a time interval, such as the number of seconds, and, for example, "-" or the like is stored.

The destination Hub computer T3204 represents the Hub computer 2400 to which the collected sensor data are to be transmitted. The reference count T3205 represents the number of corresponding records in the processing method definition table T1420, which is described later, and is incremented or decremented by the management program P1410. Note that the gateway program P3200 collects and transmits the sensor data according to a content having a record whose reference count T3205 is 1 or more.

FIG. 7 is a diagram illustrating a configuration example of the processing method change condition table T1400. The processing method change condition table T1400 is a table which is referred to by the monitoring program P1400 to monitor a change in operation process or data value, and includes information about conditions for changing a processing method. Note that the table may be created by, for example, a service provider administrator or a customer administrator of a factory or the like or may be automatically created, for example, by a program or the like for analyzing use of sensor data or processed data by an app P1200.

A condition ID T1401 is a unique ID in the table. A processing method change condition T1402 is information about a condition for changing a processing method, and for example, a change in operation process from machine failure detection to cause analysis or a change in value of data is described. A processing method ID T1403 is an ID for identifying a processing method to be executed when the above condition is satisfied. A detection completion flag T1404 is a flag representing whether the processing method change condition T1402 is satisfied as a result of monitoring by the monitoring program P1400 and the processing method has been enabled.

Note that T of the detection completion flag T1404 represents that the processing method has been enabled, and F represents that the processing method is disabled. A priority level T1405 is an item representing how much processing for relevant sensor data is prioritized over any other processing when the processing method change condition T1402 is satisfied, and the priority level T1405 may have discrete values, such as high, medium, and low, or may have continuous values expressed by numbers or the like. Note that information in the priority level T1405 is not used in the first example but used in the second example.

FIG. 8 is a diagram illustrating a configuration example of the processing method definition table T1420. The processing method definition table T1420 is a table defining a processing method for the sensor data 5100 and the processed data 5200, for example, defining that the sensor data is collected from which sensor, which processing is performed on the collected sensor data, or the processed data 5200 which has been processed is to be delivered to which app, and the like. Note that the table may be created by, for example, a service provider administrator or a customer administrator of a factory or the like or may be automatically created, for example, by a program or the like for analyzing use of sensor data or processed data by an app P1200.

A processing method definition ID T1421 is an item representing an ID uniquely determined in the table. The sensor data T1422 is equivalent to the sensor data 2202 in the data processing definition table T2200 and represents sensor data to be input to a data processing computer 2200. Data processing definition T1423 is equivalent to the processing T2203 of the data processing definition table T2200 and a parameter T1424 is equivalent to the parameter T2204, and the data processing definition T1423 is an item representing how to process the sensor data in the data processing computer 2200. A data processing computer T1425 is an item representing sensor data is to be processed by which data processing computer 2200. A processed data destination T1426 is an item representing that the processed sensor data is to be transmitted to which data processing computer 2200.

FIG. 9 is a diagram illustrating a configuration example of the data processing computer management table T1430 which includes information about each data processing computer 2200, such as an IP address and executable data processing. The data processing computer management table T1430 may be created by, for example, a service provider administrator or a customer administrator of a factory, or may be automatically created on the basis of information collected by the management program.

A data processing computer ID T1431 is an item representing an ID uniquely determined in the table. An IP T1432 is an item representing an IP address of a data processing computer 2200. Note that as long as the data processing computer 2200 can be identified on the network, data other than the IP address may be employed.

An executable processing T1433 is an item representing one or a plurality of processing steps executable on sensor data by the data processing computer 2200. For example, processing for analyzing sensor data and outputting a failure event, processing for analyzing sensor data and outputting a cause of failure, and the like correspond to the executable processing T1433. The allocated resource T1434 represents an amount of computational resources allocated to the data processing computer 2200, for example, the number of CPUs and the capacity of the memory. A load condition T1435 represents a current calculation load condition of the data processing computer, and the load condition T1435 may have discrete values, such as high, medium, and low, or may have continuous values expressed by numbers.

Note that the allocated resource T1434 and the load condition T1435 will be described in the second example. Furthermore, the information about each data processing computer 2200 may also include the information (T2201 to T2206) of the data processing definition table T2200.

FIG. 10 is a diagram illustrating a configuration example of the Hub computer management table T1440 which includes information about each Hub computer 2400, such as sensor data and a data processing computer 2200 capable of transmitting an IP address. The Hub computer management table T1440 may be created by, for example, a service provider administrator or a customer administrator of a factory, or may be automatically created on the basis of information about each Hub computer 2400 collected by the management program.

A Hub computer ID T1441 is an item representing an ID uniquely determined in the table. The IP T1432 is an item representing the IP address of the Hub computer 2400. Note that as long as the Hub computer 2400 can be identified on the network, data other than the IP address may be employed. A destination data processing computer represents one or a plurality of data processing computers 2200 capable of transferring sensor data received from a gateway computer 3200. An allocated resource T1444 represents an amount of computational resources allocated to the Hub computer 2400, for example, the number of CPUs and the capacity of the memory. A load condition T1445 represents a current calculation load condition of the Hub computer, and the load condition T1445 may have discrete values, such as high, medium, and low, or may have continuous values expressed by numbers.

The allocated resource T1444 and the load condition T1445 will be described in the second example. In addition, the information about each Hub computer 2400 may also include the information (T2401 to T2405) of the Hub processing definition table T2400.

FIG. 11 is a diagram illustrating a configuration example of the gateway computer management table T1450 which includes information about each gateway computer 3200, such as an IP address and a sensor managed. The gateway computer management table T1450 may be created by, for example, a service provider administrator or a customer administrator of a factory, or may be automatically created on the basis of information about each gateway computer 3200 collected by the management program.

A gateway computer ID T1451 is an item representing an ID uniquely determined in the table. An IP T1452 is an item representing an IP address of a gateway computer 3200. Note that as long as a gateway computer 3200 can be identified on the network, data other than the IP address may be employed. A management sensor T1453 represents one or a plurality of sensors managed by the gateway computer.

Note that the information about each gateway computer 3200 may also include the information (T3201 to T3205) of the gateway processing definition table T3200.

FIG. 12 is a diagram illustrating a configuration example of the sensor management table T1460 which includes information about each sensor, such as the type of sensor and an installation location thereof. The sensor management table T1460 may be created by, for example, a service provider administrator or a customer administrator of a factory, or may be automatically created on the basis of information about each sensor collected by the management program.

A sensor ID T1461 is an item representing an ID uniquely determined in the table. A type T1462 is an item representing the type of sensor data which can be output from each sensor, such as temperature, vibration, and pressure. An installation location T1463 is an item representing a place at which a sensor is installed, for example, a motor in a line A and the name of a building. A collection method T1464 represents a method for collecting sensor data by a gateway computer 3200, for example, a PULL method of aggressively collecting sensor data by a gateway computer 3200 and a PUSH method of aggressively transmitting data to a gateway computer 3200 by a sensor. A collectable interval T1465 represents a minimum interval at which sensor data can be collected from each sensor. An IP T1466 is an item representing an IP address of each sensor. Note that as long as each sensor can be identified on the network, data other than the IP address may be employed.

D. Flowchart

Figure 13:
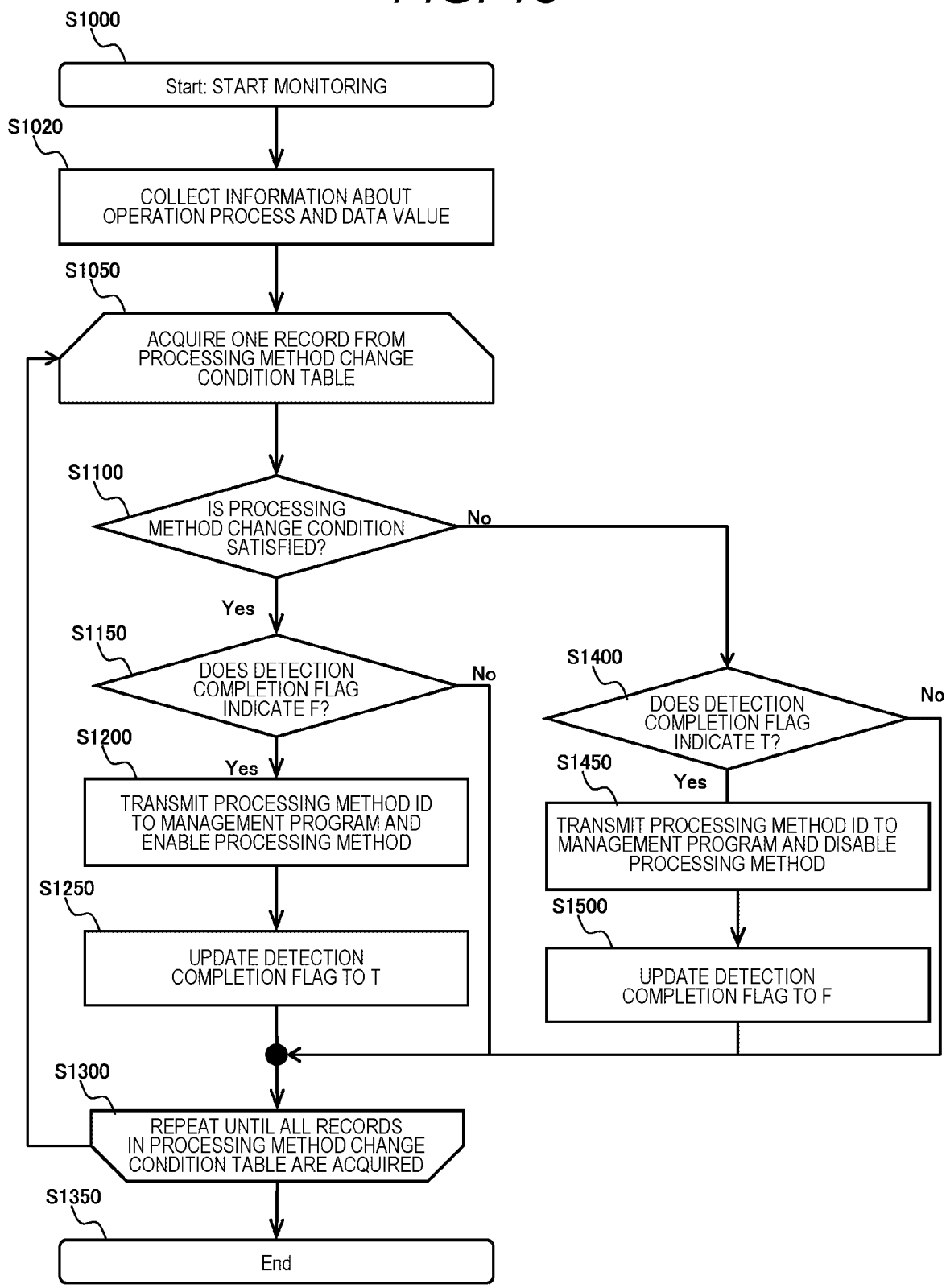
FIG. 13 is a flowchart illustrating an exemplary processing of a monitoring program.

FIG. 13 is a flowchart illustrating processing in which the monitoring program P1400 included in the management computer 1400 detects a change in operation process or a change in value of data in response to the change in operation process, and gives instructions to change a processing method relating to sensor data or processed data to the management program P1410. In the present example, processing of sensor data upon detection of a machine failure will be described. Furthermore, the program mainly operates for brief description, but the CPU 1420 and the like of the management computer 1400 operate actually mainly.

When monitoring is started in step S1000, the process proceeds to step S1020.

In step S1020, a state of an operation process or a state of a value of data changing in response to the change in an operation process is collected from app operation information, the app output information, and an output from an external system, which is not illustrated, and the process proceeds to step S1050.

Here, the value of data represents requisition for sensor data, for example, sensor data used only for certain processing (app) is required for other processing (app) due to a change in an operation process, and the change in the value of data represents that the importance of the data value changes. In other words, when the number of processing steps (the number of apps) requiring certain sensor data increases, the value of data increases, and when the number of processing steps (the number of apps) decreases, the value of data decreases. The value of this data may be set in accordance with a reference (threshold value) previously determined by an external device, which is not illustrated, a management device may include the reference, or the value of data may be changed by the management device on the basis of information from an external device, which is not illustrated. Furthermore, in another example, the value of data may be changed depending on a difference in environment. Specifically, when an earthquake occurs around a factory having a field 3000, a management device acquiring seismic intensity information from Japan meteorological agency or the like can also perform processing of raising the priority level of necessary data of sensor data 5100 in the field 3000 for understanding the influence of the earthquake on the factory (field 3000).

In step S1050, one record is acquired with reference to the processing method change condition table T1400.

In step S1100, it is checked whether a processing method change condition T1402 is satisfied, with reference to the processing method change condition table T1400 is satisfied. When the condition is satisfied, the process proceeds to step S1150, and when the condition is not satisfied, the process proceeds to step S1400. In step S1150, it is checked whether the detection completion flag T1404 of the record acquired in step S1050 indicates F, and when the flag indicates F representing that detection is not performed, the process proceeds to step S1200, and when the flag indicates T representing that detection has been performed, the process proceeds to step S1300.

In step S1200, a processing method ID T1403 acquired in step S1050 and enabling of the processing method are transmitted to the management program P1410, in step S1250, the detection completion flag T1404 of the record acquired in step S1050 is updated to T, and then the process proceeds to step S1300. Note that the processing of the management program P1410 will be described later in detail.

In step S1300, it is checked whether there is a record not yet acquired with reference to the processing method change condition table T1400, and when all records have been acquired, the processing is finished in step S1350, and otherwise, the process returns to step S1050.

In step S1400, it is checked whether the detection completion flag T1404 of the record acquired in step S1050 indicates T, and when the flag indicates T representing that detection has been performed, the process proceeds to step S1450, and when the flag indicates F representing detection is not performed, the process proceeds to step S1300.

In step S1450, a processing method ID T1403 acquired in step S1050 and disabling of the processing method are transmitted to the management program P1410, in step S1500, the detection completion flag T1404 of the record acquired in step S1050 is updated to F, and then the process proceeds to step S1300. That is, processing which does not match the changed processing method is determined to be unnecessary, and the processing is disabled.

Note that in this processing, it is assumed that the process is finished at step S1350 for the sake of explanation, but the operation process is actually monitored repeatedly at a predetermined time interval. For this reason, as illustrated in FIG. 1, even when a failure of a device is detected while an operation is performed by a certain app, the app B is activated to analyze the cause of the failure, and then, the app C is activated to implement countermeasures, the processing method for the sensor data can be changed.

Figure 14:
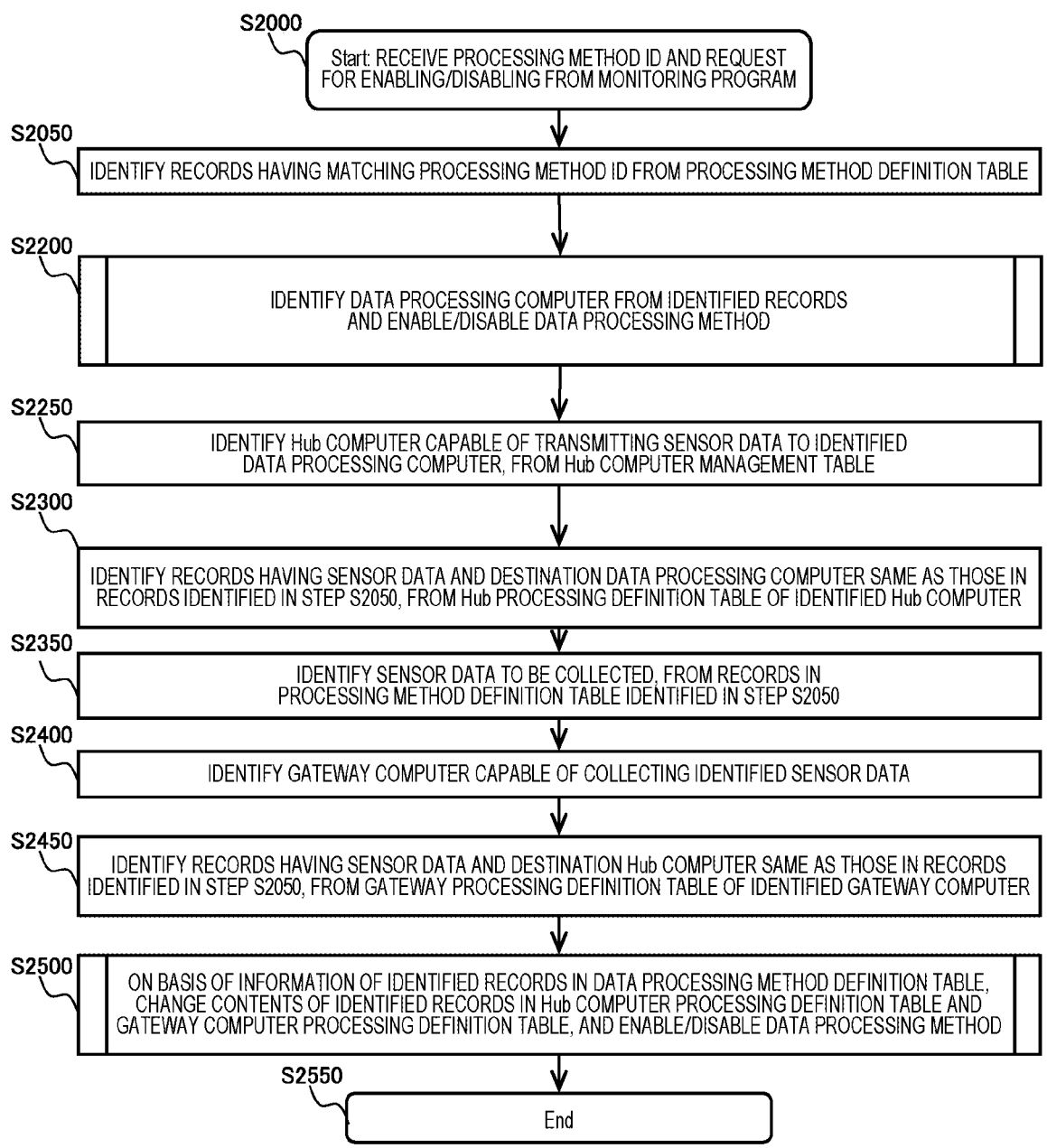
FIG. 14 is a flowchart illustrating an exemplary process relating to enabling/disabling a processing method for a management program.

Next, a description will be given with reference to FIG. 14. FIG. 14 is a flowchart relating to processing for changing a data processing method by the management program P1410 of the management computer 1400 receiving a processing method ID T1403 and a request for enabling/disabling from the monitoring program P1400, in a data processing computer 2200, the Hub computer 2400, and a gateway computer 3200

Firstly, in step S2000, a processing method ID T1403 and a request for enabling/disabling are received from the monitoring program P1400, and the process proceeds to step S2050.

In step S2050, records having a processing method ID matching the received processing method ID are identified from the processing method definition table T1420, and the process proceeds to step S2200.

In step S2200, a data processing computer 2200 for processing sensor data is identified from a data processing computer T1425 of the identified records, and after enabling/disabling a data processing method, the process proceeds to step S2250. This step S2200 will be described later in detail with reference to FIG. 15.

In step S2250, a Hub computer 2400 capable of transmitting the sensor data from the Hub computer management table T1440 to the identified data processing computer 2200 is identified, on the basis of the column of a destination data processing computer T1443, and the process proceeds to step S2300.

In step S2300, the Hub processing definition table T2400 of the identified Hub computer 2400 is referred to, records having a sensor data ID T2402 and destination data processing computer T2404 the same as those of the records in the processing method definition table T1420 identified in S2050 are identified from the Hub processing definition table T2400, and the process proceeds to step S2350. This processing identifies records in the Hub processing definition table T2400 for enabling/disabling a data processing method. Note that when no record is identified, the process similarly proceeds to step S2350 to perform processing for adding new records in S2500, which is described later.

Then, in step S2350, a sensor data T1422 to be collected is identified from the records in the processing method definition table T1420 identified in step S2050, and the process proceeds to step S2400.

In step S2400, a gateway computer 3200 capable of collecting the identified sensor data is identified from the gateway computer management table T1450, and the process proceeds to step S2450.

In step S2450, records having sensor data and a destination Hub computer the same as the sensor data T3202 and the destination Hub computer T3204 described in the records identified in step S2050 are identified from the gateway processing definition table T3200 of the identified gateway computer 3200. This processing identifies records in the Hub processing definition table T2400 for enabling/disabling a data processing method. Note that when no record is identified, the process similarly proceeds to step S2500 to perform processing for adding new records in S2500, which is described later.

In step S2500, on the basis of the information of the identified records in the processing method definition table T1420, the contents of the identified records in the Hub processing definition table T2400 and the identified records in the gateway processing definition table T3200 are changed, data processing method is enabled/disabled, and the process is finished in step S2550. Step S2550 will be described later in detail with reference to FIG. 16.

Figure 15:
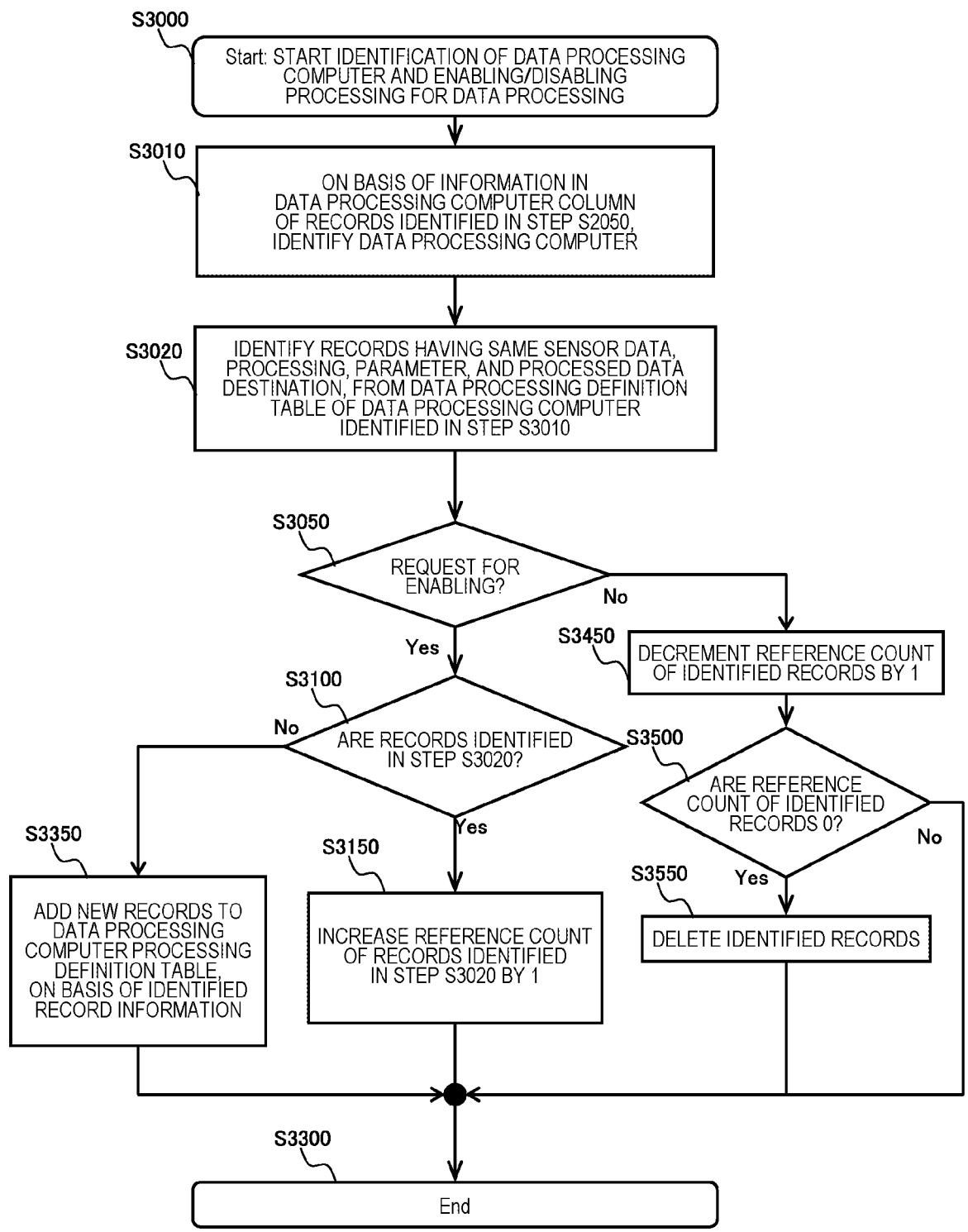
FIG. 15 is a flowchart illustrating an exemplary process of identifying a data processing computer and enabling/disabling data processing in the management program.

Next, a description will be given with reference to FIG. 15. FIG. 15 is a flowchart illustrating processing performed when the management program P1410 of the management computer 1400 identifies a data processing computer 2200 having a data processing method to be changed and changes the data processing method.

In step S3000, processing for identifying a data processing computer having a data processing method to be changed and enabling/disabling data processing are started, and the process proceeds to step S3010.

In step S3010, on the basis of information in the column of the data processing computer of the records in the processing method definition table T1420 identified in step S2050, a data processing computer for which the processing method is to be changed is identified, and the process proceeds to step S3020.

In step S3020, from the data processing definition table T2200 of the data processing computer 2200 identified in step S3010, records having the same sensor data T2202, processing T2203, parameter T2204, and processed data destination T2205 are identified, and the process proceeds to step S3050.

In step S3050, it is determined whether an instruction received from the monitoring program P1400 represents enabling or disabling of the processing method, and when the instruction represents the enabling of the processing method, the process proceeds to step S3100, and when the instruction represents the disabling of the processing method, the process proceeds to step S3450.

In step S3100, it is determined whether records are identified in step S3020, and when the records are identified, the process proceeds to step S3150, otherwise, the process proceeds to step S3350.

In step S3150, a reference count T2206 of the records identified in step S3020 is incremented by 1, and the process is finished in step S3300.

In step S3350, new records are added to the data processing definition table T2200, on the basis of the information of the records identified in step S3020, and the process is finished in step S3300.

In step S3450, the reference count T2206 of the records identified in step S3020 is decremented by 1, and the process proceeds to step S3500. Sensor data T2202, processing T2203, parameter T2204, and processed data destination T2205 of the new records are created from information in the sensor data T1422, data processing definition T1423, parameter T1424, and processed data destination T1426 in the processing method definition table T1420, and the reference count T2206 is set to 1.

In step S3500, it is determined whether the reference count T2206 of the records identified in step S3020 indicates 0, and when the reference count T2206 indicates 0, the records are deleted in step S3550, otherwise, the process proceeds to step S3300 and the process is finished.

Figure 16:
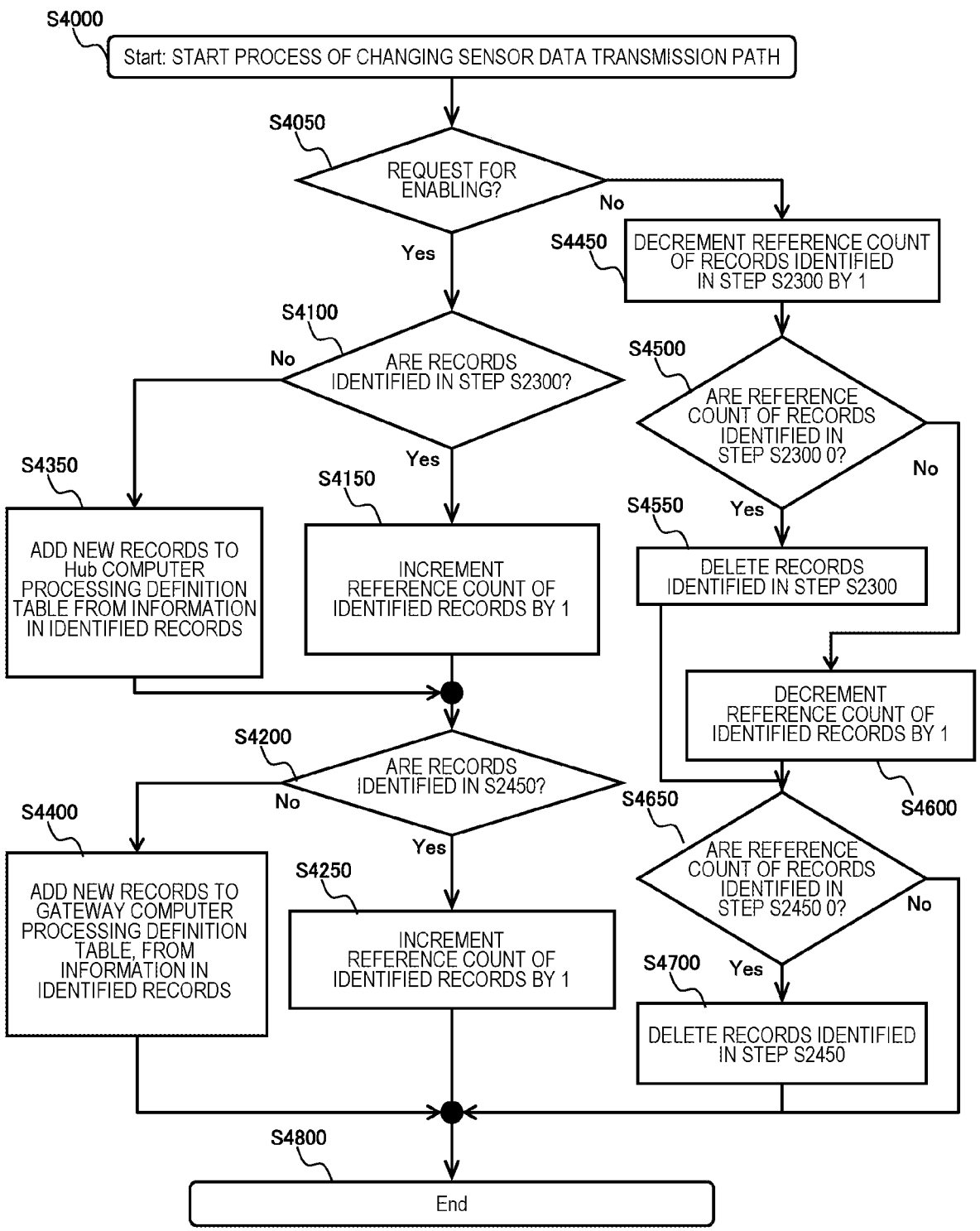
FIG. 16 is a flowchart illustrating an exemplary sensor data transmission path changing process in the management program.

Next, a description will be given with reference to FIG. 16. FIG. 16 is a flowchart illustrating a process of changing the contents of the identified records in the gateway processing definition table T3200 and the identified records in the Hub processing definition table T2400 in the management program P1410 of the management computer 1400. A sensor data transmission path changed by the processing for changing the records may be called a sensor data transmission path changing process.

In step S4000, the sensor data transmission path changing process is started, and the process proceeds to step S4050.

In step S4050, it is determined whether an instruction received from the monitoring program P1400 represents enabling or disabling of the processing method, and when the instruction represents the enabling of the processing method, the process proceeds to step S4100, and when the instruction represents the disabling of the processing method, the process proceeds to step S4450.

In step S4110, it is determined whether records in the Hub processing definition table T2400 are identified in step S2300. When the records in the Hub processing definition table T2400 are identified, the process proceeds to step S4150, and otherwise, the process proceeds to step S4350.

In step S4150, the reference count T2405 of the records in the Hub processing definition table T2400 identified in step S2300 is incremented by 1, and the process proceeds to step S4200.

In step S4350, new records are added to the Hub processing definition table T2400 on the basis of information in the records identified in step S2300, and the process proceeds to step S4200. Sensor data ID T2402 and a destination data processing computer T2404 of the new records are created from information in the sensor data T1422 of the processing method definition table T1420 and information in the processed data destination T1426. Furthermore, a gateway computer capable of transmitting sensor data in the sensor data ID T2402, which is identified from information in the management sensor T1453 in the gateway computer management table T1450, is described in the source gateway computer T2403. Note that the reference count T2405 of the new records is set to 1.

In step S4200, it is determined whether the records in the gateway processing definition table T3200 are identified in step S2450, and when the records in the gateway processing definition table T3200 are identified, the process proceeds to step S4250, and otherwise, the process proceeds to step S4400.

In step S4250, the reference count T3205 of the records in the gateway processing definition table T3200 identified in step S2450 is incremented by 1, and the process is finished in step S4800.

In step S4400, new records are added to the gateway processing definition table T3200 on the basis of the information described in the records identified in step S2450, and the process is finished in step S4800. Sensor data ID T2402, collection interval T3203, and destination Hub computer T3204 of the new records are created from information in the sensor data T1422, the parameter T1424, and the processed data destination T1426 in the processing method definition table T1420. Note that the reference count T3205 of the new record is set to 1.

On the other hand, in step S4450, the reference count T2405 of the records in the Hub processing definition table T2400 identified in step S2300 is decremented by 1, and the process proceeds to step S4500.

In step S4500, it is determined whether the reference count T2405 of the records identified in step S2300 indicates 0. When the reference count T2405 indicates 0 as a result of the determination, the process proceeds to next step S4550, the records identified in the step S2300 are deleted, and the process proceeds to step S4650. When the reference count T2405 does not indicate 0 as a result of the determination, the process proceeds to step S4600.

In step S4600, the reference count T3205 of the records in the gateway processing definition table T3200 identified in step S2450 is decremented by 1, and the process proceeds to step S4650.

In step S4650, it is determined whether the reference count T3205 of the records in the gateway processing definition table identified in step S2450 is 0. When the value of the reference count T3205 is other than 0, the process proceeds to step S4800. When the value of the reference count T3205 is 0, the records in the gateway processing definition table T3200 identified in step S2450 are deleted in step S4700, and the process proceeds to step S4800 and the process is finished.

Performance of this process, it is possible to add or delete new records to the Hub processing definition table T2400 and the gateway processing definition table T3200, and it is possible to add or delete a sensor data path.

Figure 17:
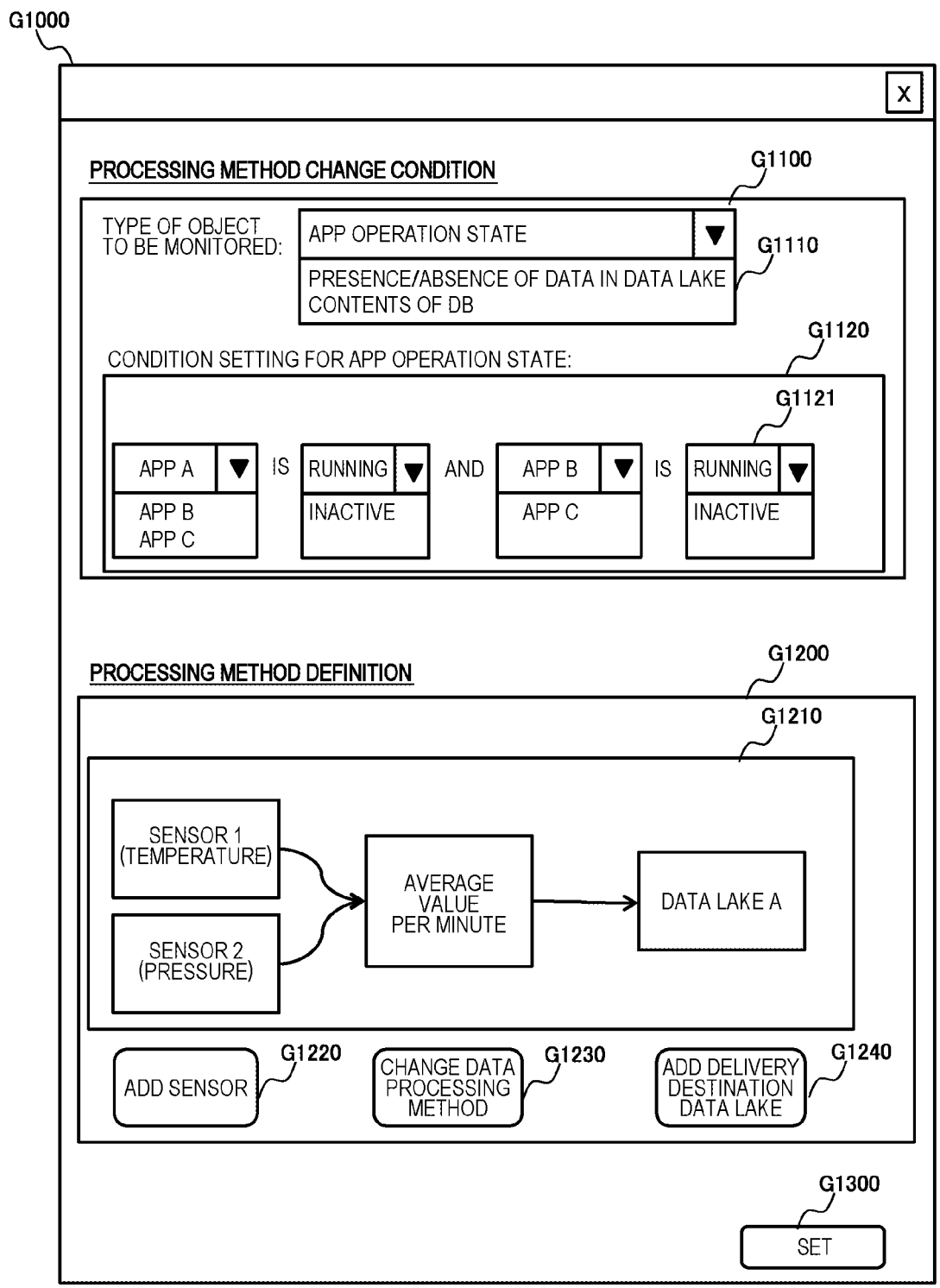
FIG. 17 is a diagram illustrating an example of a screen for inputting the definition of a processing method and a change condition.

Next, a description will be given with reference to FIG. 17. FIG. 17 is a diagram illustrating an example of a screen for inputting a condition for changing a processing method for sensor data by the management computer, such as a change in operation process or value of data, and the contents of processing after changing when the condition is satisfied.

A screen G1000 includes a condition form G1100 for specifying a condition for changing a processing method for sensor data and a processing method definition form G1200 for specifying the contents of processing after changing when the condition is satisfied.

The condition form G1100 includes, for example, G1110 indicating a type of an object to be monitored and G1121 specifying conditions for an app operation state. For example, the conditions that the app A is in operation and the app B is in operation may be specified in order to detect a change in operation process, the conditions that a result of processing for a specific app is stored in the data lake of the data providing computer and the result of the processing exceeds a specific threshold value may be specified in order to detect a change in value of data, or conditions other than the above conditions may be specified.

The processing method definition form G1200 may include a processing method input form G1210 for defining how to process sensor data, a button G1220 for adding sensor data to the processing method input form, a button G1230 for changing the data processing method, and a button G1240 for adding a data lake for delivering processed data.

The contents input to the condition form G1100 are reflected in the processing method change condition table T1400 of the management computer 1400 when a setting button G1300 is pressed, and the contents input to the processing method definition form G1200 are reflected in the processing method definition table T1420.

As described above, in the system according to the present example, performance of a series of processing as described above enables collection of sensor data and processing for the sensor data, for a plurality of different computers, in response to a change in operation process or in value of data according to a change in the operation process, and processed data can be distributed to each app.

Second Example

The data processing computers 2200 and the Hub computer 2400 are included in the service provider data center in the first example, while in a second example, the data processing computers 2200 and the Hub computer 2400 are included in a customer data center 2000.

Here, the customer data center 2000 is a data center managed by a customer of a field 3000, such as a factory. The customer data center 2000 provided between the service provider data center 1000 and the field 3000 as described above enables, for example, the customer to keep sensor data secret from the service provider, uniquely process the sensor data, or uniquely save the sensor data.

The service provider data center 1000 is a data center for providing a cloud computing service and has abundant computational resources. However, the customer data center 2000 has limited computational resources due to restrictions on monetary cost or restrictions on a physical space in which the computers are installed. Therefore, if all of an enormous amount of sensor data is processed by using computers of the customer data center, computational resources may become insufficient.

On the other hand, depending on a condition of an operation process or a value of the sensor data, for example, sensor data may provide processed data to be processed within several seconds and to be delivered to the data providing computer 1300 or processed data preferably delivered to a data processing computer 2200 once a day.

Therefore, a priority control means is required to prevent exhaustion of the computational resources of the customer data center and to preferentially perform processing on specific sensor data to transmit processed data to the data providing computer.

As an example of performing priority control, the second example includes means for adjusting the resource amount allocated of the computers of the customer data center 2000 according to a state of an operation process or the value of sensor data. Note that in the second example, the customer data center 2000 is exemplified, but even in the configuration described in the first example, processing for priority control may be applied.

Figure 18:
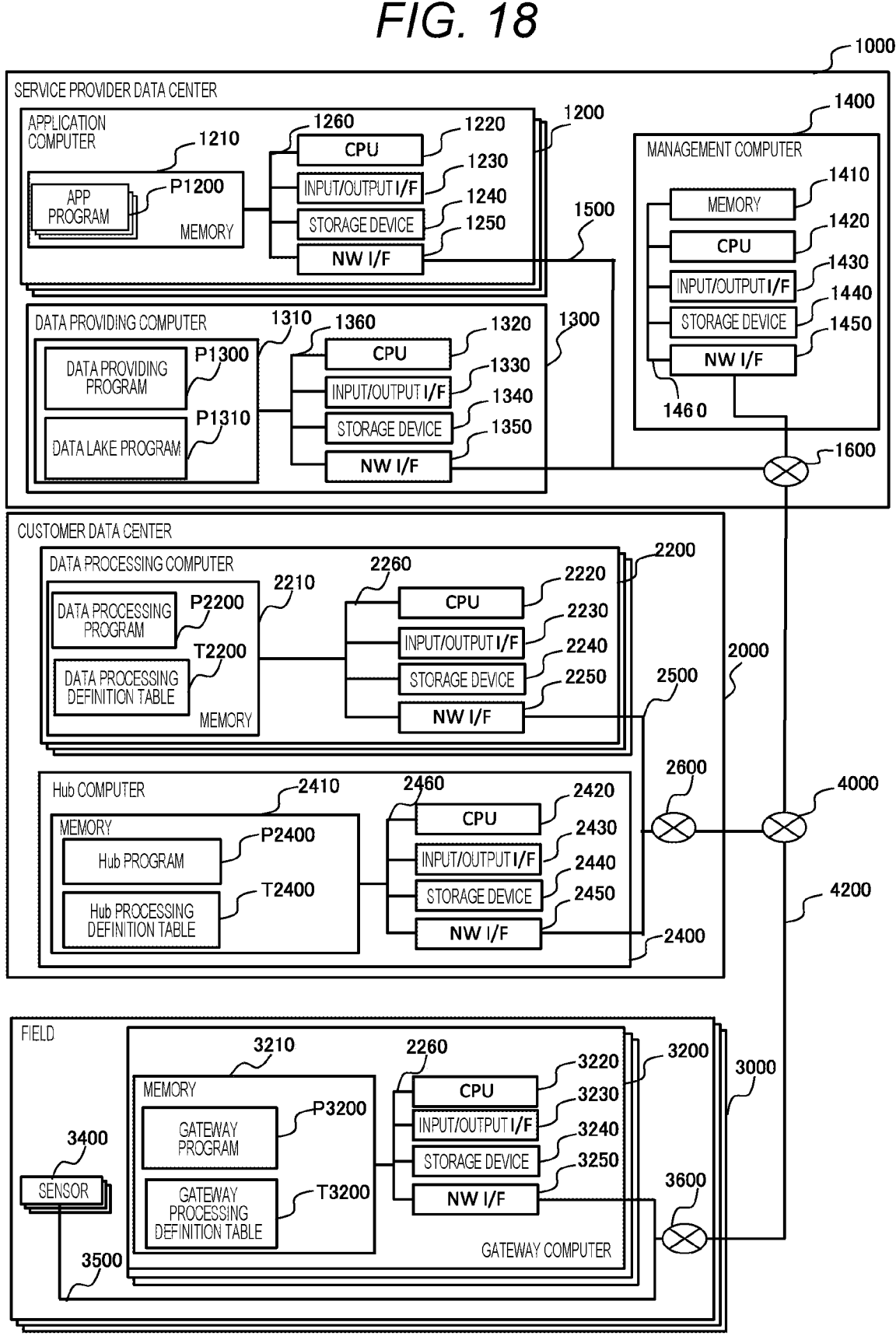
FIG. 18 is a diagram illustrating a configuration example of a system including a customer data center.

FIG. 18 is a block diagram illustrating a configuration of a system according to the second example.

The second example is different from the first example in configuration, in which the data processing computers 2200 and the Hub computer 2400 included in the service provider data center 1000 in the first example are included in the customer data center 2000.

Communication between the computers of the customer data center 2000 is performed via the network device 2600 and a network 2500, and communication between each computer of the customer data center 2000 and the service provider data center 1000 or a field 3000 is performed via the network 4200 and the network device 4000.

In addition to the data processing computers 2200 and the Hub computer 2400 of the customer data center 2000, the service provider data center 1000 may include a data processing computer 2200 and a Hub computer 2400.

Figure 19:
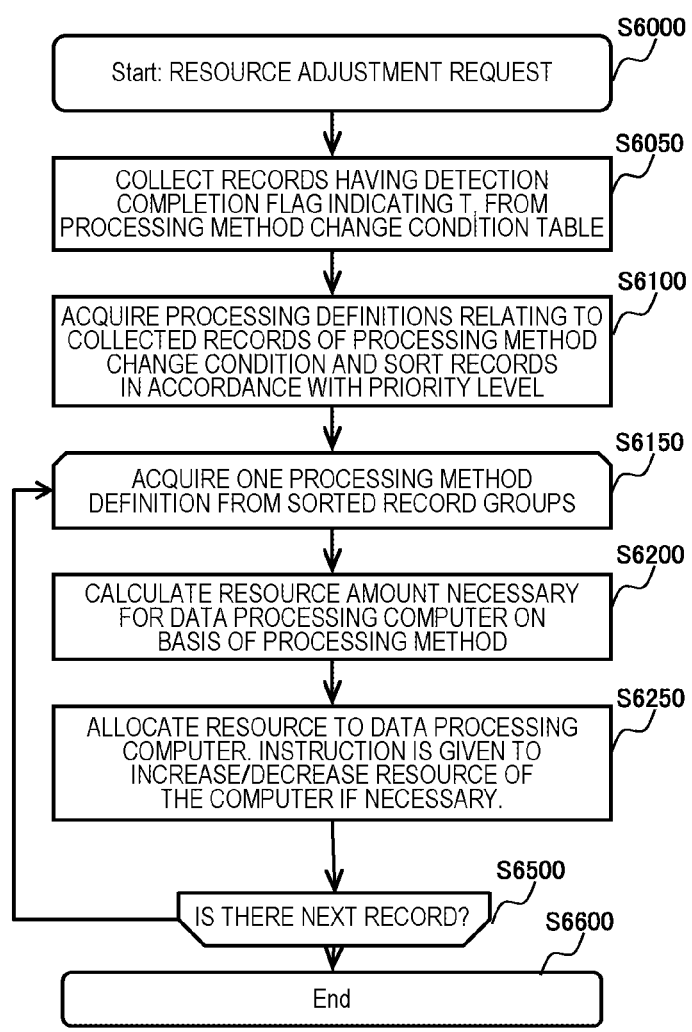
FIG. 19 is a flowchart illustrating an example of a resource adjustment process performed by the management program.

Next, a description will be given with reference to FIG. 19. FIG. 19 is a flowchart illustrating a process for adjusting the amount of computational resources of one or a plurality of data processing computers 2200 of the customer data center by the management program P1410 of the management computer 1400 to execute processing on sensor data within limited computational resources. The processing of the flowchart may be executed immediately after step S2200 or immediately after step S2500 described in the description of FIG. 14 or may be executed periodically. Furthermore, the processing of the flowchart may be executed at timing other than the above.

When a resource adjustment process is started in step S6000, the process proceeds to step S6050.

Steps S6050 and S6100 are steps for collecting currently effective processing methods and the priority levels for the processing methods to identify a processing method to which resources are to be allocated.

In step S6050, record groups having a detection completion flag T1404 indicating T are collected from the processing method change condition table T1400, and the process proceeds to step S6100.

In step S6100, the record groups collected in step S6050 are sorted in descending order of priority level on the basis of information about the priority level described in the priority level T1405, and the process proceeds to step S6150.

In steps S6150 to S6500, a processing method definition, which is described in the processing method definition table T1420 associated with the processing method ID T1403 of the processing method change condition table T1400 having a higher priority level, is adjusted to be allocated more resources.

In step S6150, one record is acquired from the record groups sorted in step S6100, and the process proceeds to step S6200.

In step S6200, a resource amount necessary for a data processing computer 2200 is calculated from information about processing of the record acquired in step S6150, and the process proceeds to step S6250. For example, in a method of calculating the resource amount, a data amount per sensor data may be determined from the type of the sensor data described in the sensor data T1422 (for example, from a data processing definition T1423 and parameter T1424), the resource amount necessary for each record acquired in step S6200 may be determined by using a statistical method, or the resource amount may be determined by using another method.

In step S6250, instructions for increasing or reducing the resource amount of the data processing computer 2200 is given on the basis of information about the calculated resource amount. Specifically, when the data processing computer 2200 is virtualized, instructions are given to a management system, which is not illustrated, managing the data processing computer. After giving the instructions, the resource amount increased or decreased and allocated is recorded in the allocated resource T1434 of the data processing computer management table T1430, and the process proceeds to step S6500.

In step S6500, it is determined whether there is a record not yet acquired in step S6150 in the records in the processing method definition table T1420 sorted in step S6100. When there is a record not yet acquired, step S6150 is performed, and otherwise, the process is finished in S6600.

Owing to the processing described above, the resource amount of a data processing computer 2200 is changed on the basis of information in the priority level T1405 of the processing method change condition table T1400 and information in the processing method definition table T1420, and the resources can be provided for a data processing computer 2200 requiring resources.

Figure 20:
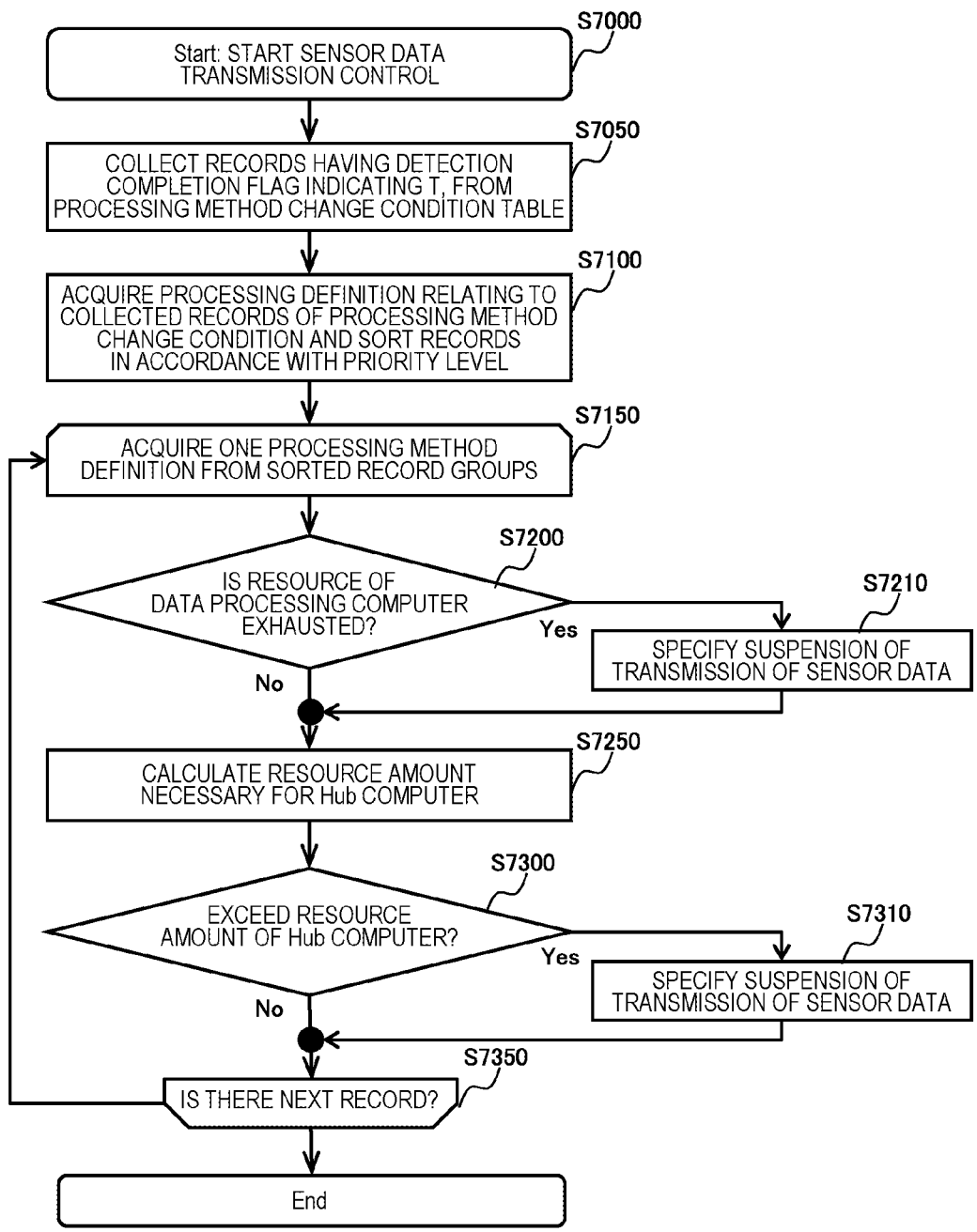
FIG. 20 is a flowchart illustrating an example of a transmission control process for sensor data performed by the management program.

Next, a description will be given with reference to FIG. 20. FIG. 20 is a flowchart illustrating a process of transmission priority control for sensor data by using the management program to suspend transmission of the sensor data by a gateway computer 3200 or the Hub computer 2400 so that a data processing computer 2200 executes processing for the sensor data within a limited computational resources.

The processing in the flowchart of FIG. 20 may be performed immediately after step S2500 described in the description of FIG. 14, may be periodically executed, or may be executed at timing other than the above.

When a transmission control process for sensor data is started in step S7000, the process proceeds to step S7050.

Steps S7050 and S7100 are steps for collecting currently effective processing method definitions and the priority levels for the processing method definitions to determine whether transmission of the sensor data is to be suppressed.

In step S7050, record groups having a detection completion flag T1404 indicating T are collected from the processing method change condition table T1400, and the process proceeds to step S7100.

In step S7100, the record groups collected in step S7050 are sorted in descending order of priority level on the basis of information about the priority level described in the priority level T1405, and the process proceeds to step S7150.

In steps S7150 to S7500, a processing method definition ID T1421, which is described in the processing method definition table T1420 associated with a processing method ID T1403 in the processing method change condition table T1400 having a high priority level, is determined whether to require a resource amount exceeding a resource amount processable by a data processing computer 2200 or the Hub computer 2400, which is a transmission destination of the sensor data. On the basis of a result of the determination, when processing method definition ID T1421 requires a resource amount exceeding the resource amount of the data processing computer 2200 or the Hub computer 2400, transmission of the sensor data is temporarily suspended, thereby preventing resource exhaustion of each computer.

In step S7150, one record is acquired from the record groups sorted in step S7100, and the process proceeds to step S7200.

In step S7200, a resource amount necessary for the data processing computer 2200 is calculated from information about processing of the record acquired in step S7150. Furthermore, it is determined whether the data processing computer can perform the processing, from the calculated resource amount, information in the load condition T1445 in the data processing computer management table T1430, and information about the currently allocated resource T1434. When it is determined that the processing can be performed, the process proceeds to step S7250, and when the resource is to be exhausted, the process proceeds to step S7210.

In step S7210, in order to avoid resource exhaustion of the data processing computer, the Hub computer is instructed to suspend transmission of the sensor data to the data processing computer. Note that, in this step, not the instruction for suspension of transmission of the sensor data but an instruction or the like for flow rate control, such as suppressing the amount of data to be transmitted may be employed, as long as it is intended to avoid the resource exhaustion.

In step S7250, a resource amount necessary for the Hub computer 2400 is calculated from information about processing of the record acquired in step S7200, and the process proceeds to step S7300.

In step S7300, it is determined whether the resource exhaustion is generated in the Hub processing computer, from the calculated resource amount necessary for the calculated Hub computer, information in the load condition T1445 in the Hub computer management table T1440, and information about the currently allocated resource T1444. When the resource exhaustion does not occur, the process proceeds to step S7350, and when the resource exhaustion occurs, the process proceeds to S7310.

In step S7350, it is determined whether there is a record not yet acquired in step S7150 in the records in the processing method definition table T1420 sorted in step S7100. When there is a record not yet acquired, the process proceeds to step S7150, and otherwise, the process is finished in S7400.

In step S7310, in order to avoid resource exhaustion of the Hub computer, the gateway computer is instructed to suspend transmission of the sensor data.

Note that, for the processing of suspending transmission of the sensor data in the Hub computer or the gateway computer, the storage device of each computer suspending transmission of the sensor data may be used, the memory may be used, or other computers may be used. Instead of suspending transmission of the sensor data, the sensor data may be transmitted to another data processing computer 2200 having abundant resources for processing, as described in the first example.

Owing to the processing described above, transmission of the sensor data is suspended by using the Hub computer 2400 and a gateway computer 3000 on the basis of information described in the priority level T1405 of the processing method change condition table T1400 and information in the processing method definition table T1420, avoiding resource exhaustion in the data processing computer 2200.

In the second example, the configuration as described above can perform priority control for preventing exhaustion of the computational resources of the customer data center 2000 and for preferentially performing processing on specific sensor data to transmit processed data according to a customer policy to the data providing computer 1300.

Note that the present invention is not limited to the above examples, and includes various modifications. Furthermore, for example, in the above examples, configurations are described in detail for ease of understanding the present invention, and therefore, the present invention is not necessarily limited to a configuration including all of the configurations described above. Still furthermore, addition, elimination, or substitution of part of the configurations of the respective examples may be made with respect to another configuration.

In addition, the configurations, functions, processing units, processing means, and the like described above may be partially or wholly achieved by hardware, such as a designed integrated circuit. Furthermore, the present invention can be also achieved by program codes for software which achieve functions of the examples. In this configuration, a storage medium recording the program codes is provided to a computer, and a CPU included in the computer reads the program codes stored in the storage medium. In this case, the program codes themselves read from the storage medium achieve the functions of the examples described above, and the program codes themselves and the storage medium storing the program codes constitute the present invention. For example, for the storage medium for supplying such program codes, a flexible disk, CD-ROM, DVD-ROM, hard disk, solid state drive (SSD), optical disk, magneto-optical disk, CD-R, magnetic tape, nonvolatile memory card, ROM, or the like is used.

In addition, a program code for achieving a function described in the present example can be implemented in a wide range of programs or script language, such as assembler, C/C++, perl, Shell, PHP, Java.

Furthermore, the program codes for software achieving the functions of the examples may be delivered via a network to be stored in storage means, such as a hard disk or a memory of a computer, or a storage medium, such as a CD-RW or a CD-R, and the program codes stored in the storage means or the storage medium may be read and executed by a CPU of the computer.

In the above examples, control lines or information lines considered necessary for description are described, and not necessarily all the control lines or information lines required for a product are shown. All the configurations may be mutually connected.

REFERENCE SIGNS LIST

1000 service provider data center
1200 application computer
1300 data providing computer
1400 management computer
2200 data processing computer
2400 Hub computer
3000 field
3200 gateway computer
3400 sensor
5000 operation
5100 sensor data
5200 processed data
P1200 application
P1300 data providing program
P1310 data lake
P1400 monitoring program
P1410 management program
P2200 data processing program
P2400 Hub program
P3200 gateway program
T1400 processing method change condition table
T1420 processing method definition table
T2200 data processing definition table
T2400 Hub processing definition table
T3200 gateway processing definition table

The invention claimed is:

1. A management computer comprising
   a control unit which stores, in a memory, a monitoring means for monitoring a plurality of operation processes to be monitored and management means connected to a network to manage management information about a plurality of different types of external devices for processing a plurality of types of sensor information via the network, the control unit executing the monitoring means and management means in a central processing unit (CPU); and
   a storage unit which stores processing method change condition information,
   wherein the control unit
   determines whether the plurality of operation processes to be monitored is changed,
   instructs, when determining that the operation processes are changed, the plurality of different types of external devices to change the processing of the sensor information required to execute the operation process after changing determines, using the processing method change condition information, whether the operation process is changed and processing method definition information used to identify the plurality of different types of external devices corresponding to the change of the operation process to give instructions to change processing of the plurality of types of sensor information, and wherein instructions to the plurality of different types of external devices include instructions for changing the type of the sensor information used for the operation process, instructions for changing a transfer path for the sensor information, and instructions for changing a processing method for the sensor information.

2. The management computer according to claim 1, wherein
the processing method definition information includes priority level information in which a priority level of processing is determined in advance, and
the control unit outputs instructions to one of the plurality of different types of external devices identified on the basis of the processing method definition information to increase or decrease an amount of computational resources of the identified one of the plurality of different types of external devices on the basis of the priority level information.

3. The management computer according to claim 1, wherein
the processing method definition information includes load information of the plurality of different types of external devices, and
the control unit outputs instructions to the plurality of different types of external devices on the basis of the load information.

4. The management computer according to claim 3, wherein
the control unit outputs a transmission instruction for causing a first external device to transmit the sensor information to a second external device, a suspension instruction for suspending transmission of the sensor information from the first external device to the second external device, or a flow rate control instruction for adjusting an amount of the sensor information transmitted, to the first external device as a source of the sensor information of the plurality of different types of external devices, on the basis of the load information of the second external device as a destination of the sensor information of the plurality of different types of external devices.

5. The management computer according to claim 1, further comprising:
an output unit which displays a screen for prompting a user to operate; and
an input unit which receives input from the user,
wherein a screen which receives input to change the processing method change condition information or the processing method definition information is output to the output unit.

6. The management computer according to claim 1, wherein
the change of the operation process also includes change of a value of the sensor information, and
the control unit changes the value of the sensor information included in the processing method change condition information on the basis of external environment information transmitted from another external device upon a change in external environment.

7. A data processing system comprising:
a relay computer which transfers sensor information received from an external device;
a data processing computer which processes and transfers the sensor information received from the relay computer;
a data providing computer which stores the sensor information transferred from the data processing computer and processed to transfer the sensor information to an application computer which executes an application at predetermined timing; and
a management computer which manages the relay computer and the data processing computer and monitors the application,
wherein the management computer, when determining change of the application, instructs the relay computer and the data processing computer to change processing of the sensor information corresponding to the change of the application, and
wherein the management computer stores processing method change condition information used to determine whether the application is changed and processing method definition information used to identify the relay computer and the data processing computer corresponding to the change of the application to give instructions to change processing of the sensor information.

8. The data processing system according to claim 7, wherein
the processing method definition information includes priority level information in which a priority level of processing is determined in advance, and
the management computer determines a resource of the data processing computer identified on the basis of the processing method definition information and outputs instructions to the data processing device to increase or decrease the resource on the basis of the priority level.

9. The data processing system according to claim 7, wherein
the processing method definition information includes load information of the relay computer and the data processing computer, and
the management computer outputs a transmission instruction, a suspension instruction, or a flow rate control instruction on the sensor information on the basis of the load information.

10. The data processing system according to claim 9, wherein
the management computer transmits the transmission instruction or the suspension instruction based on the load information of the data processing computer as a destination of the sensor information to the relay computer as a source of the sensor information.

11. The data processing system according to claim 7, wherein
the change of the application includes change of a value of the sensor information, and
the management computer changes the value of the sensor information included in the processing method change condition information on the basis of external environment information transmitted from another external device upon a change in external environment.

12. A non-transitory computer readable medium storing a data processing program for controlling a management computer for managing a plurality of different types of external devices connected via a network, when executed by a processor, causes the processor to:
- monitor a plurality of operation processes to be monitored;
- determines whether the plurality of operation processes to be monitored are changed;
- instruct, when determining that the operation processes are changed, the plurality of different types of external devices to change processing of sensor information required to execute the operation processes after changing;
- determine, using processing method change condition information, whether the operation process is changed and processing method definition information used to identify the plurality of different types of external devices corresponding to the change of the operation process to give instructions to change processing of a plurality of types of sensor information; and
- wherein instructions to the plurality of different types of external devices include instructions for changing the type of the sensor information used for the operation process, instructions for changing a transfer path for the sensor information, and instructions for changing a processing method for the sensor information.

* * * * *